(12) United States Patent
Kim et al.

(10) Patent No.: US 10,880,586 B2
(45) Date of Patent: Dec. 29, 2020

(54) METHOD AND DEVICE FOR TRANSMITTING AND RECEIVING MMTP PACKET

(71) Applicant: Samsung Electronics Co., Ltd., Suwon-si (KR)

(72) Inventors: Dong-Yeon Kim, Seoul (KR); Kyung-Mo Park, Seoul (KR); Jae-Hyeon Bae, Seoul (KR); Young-Wan So, Gunpo-si (KR); Hyun-Koo Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/304,468

(22) PCT Filed: May 26, 2017

(86) PCT No.: PCT/KR2017/005554
§ 371 (c)(1),
(2) Date: Nov. 26, 2018

(87) PCT Pub. No.: WO2017/204601
PCT Pub. Date: Nov. 30, 2017

(65) Prior Publication Data
US 2019/0297357 A1 Sep. 26, 2019

(30) Foreign Application Priority Data
May 26, 2016 (KR) .................... 10-2016-0065059

(51) Int. Cl.
*H04N 7/173* (2011.01)
*H04N 21/2343* (2011.01)
(Continued)

(52) U.S. Cl.
CPC ..... *H04N 21/2343* (2013.01); *H04N 21/4363* (2013.01); *H04N 21/4402* (2013.01); *H04N 21/61* (2013.01)

(58) Field of Classification Search
None
See application file for complete search history.

(56) References Cited

U.S. PATENT DOCUMENTS 8,065,432 B2 * 11/2011 Henry ................ G06F 13/387
709/238
8,214,422 B1 * 7/2012 Woodward, Jr. ............
H04N 21/25808
709/201
(Continued)

FOREIGN PATENT DOCUMENTS

CN 1516840 A 7/2004
CN 105075323 A 11/2015
(Continued)

OTHER PUBLICATIONS

Advanced Television Systems Committee; ATSC Candidate Standard: Signaling, Delivery, Synchronization and Error Protection (A/331); Jan. 5, 2016; pp. 1-132; Doc. S33-174r1; Washington, DC.
(Continued)

*Primary Examiner* — William J Kim
(74) *Attorney, Agent, or Firm* — Jefferson IP Law, LLP

(57) ABSTRACT

A method for transmitting and receiving an MMT protocol (MMTP) packet by an MPEG media transport (MMT) receiver is disclosed. The method comprises the steps of: by an MMT receiver, establishing a network connection with an MMT transmitter such that an MMTP packet can be transmitted and received; generating a first MMT signaling message; converting the generated first MMT signaling message into a first MMTP packet; transmitting the first MMTP packet by means of the established network connec-
(Continued)

tion; receiving a second MMTP packet by means of the established network connection; generating a second MMT signaling message by means of the second MMTP packet; receiving a third MMTP packet; and reconstructing MPU data by means of the third MMTP packet and the second MMT signaling message. The step for receiving the third MMTP packet comprises the steps of: establishing a changed network connection on the basis of the second MMT signaling message; and receiving the third MMTP packet by means of the changed network connection.

12 Claims, 14 Drawing Sheets

(51) Int. Cl.
*H04N 21/4363* (2011.01)
*H04N 21/4402* (2011.01)
*H04N 21/61* (2011.01)

(56) References Cited

U.S. PATENT DOCUMENTS

| | | | |
|---|---|---|---|
| 2002/0161907 A1 | 10/2002 | Moon | |
| 2003/0028654 A1* | 2/2003 | Abjanic | H04L 63/0428 709/229 |
| 2004/0230660 A1* | 11/2004 | Abjanic | H04L 67/1008 709/207 |
| 2010/0046430 A1* | 2/2010 | Naito | H04L 45/22 370/328 |
| 2010/0198979 A1* | 8/2010 | Pickens | H04L 29/12405 709/231 |
| 2014/0023071 A1 | 1/2014 | Park et al. | |
| 2014/0282799 A1 | 9/2014 | Bae | |
| 2014/0314080 A1* | 10/2014 | Park | H04L 65/607 370/391 |
| 2014/0317664 A1* | 10/2014 | Park | H04N 21/23614 725/109 |
| 2015/0032845 A1 | 1/2015 | Bouazizi et al. | |
| 2015/0373380 A1* | 12/2015 | Tsukagoshi | H04L 5/0044 725/109 |
| 2016/0056927 A1 | 2/2016 | Liu et al. | |
| 2016/0226939 A1* | 8/2016 | Kwak | H04L 65/4076 |
| 2016/0255394 A1* | 9/2016 | Yang | H04N 21/434 725/131 |
| 2016/0323032 A1* | 11/2016 | Ulupinar | H04B 7/18541 |
| 2016/0323800 A1* | 11/2016 | Ulupinar | H04W 36/38 |
| 2018/0295407 A1* | 10/2018 | Michael | H04H 20/44 |

FOREIGN PATENT DOCUMENTS

| | | |
|---|---|---|
| CN | 105409174 A | 3/2016 |
| EP | 2784964 A1 | 10/2014 |
| KR | 10-2013-0040132 A | 4/2013 |
| KR | 10-2014-0010813 A | 1/2014 |
| KR | 10-2015-0013081 A | 2/2015 |
| KR | 10-2017-0043972 A | 4/2017 |

OTHER PUBLICATIONS

Chinese Office Action dated Aug. 5, 2020, issued in Chinese Application No. 201780032469.5.

* cited by examiner

METHOD AND DEVICE FOR TRANSMITTING AND RECEIVING MMTP PACKET

CROSS-REFERENCE TO RELATED APPLICATIONS

This application is a U.S. National Stage application under 35 U.S.C. § 371 of an International application number PCT/KR2017/005554, filed on May 26, 2017, which is based on and claimed priority of a Korean patent application number 10-2016-0065059, filed on May 26, 2016, in the Korean Intellectual Property the disclosure of which is incorporated by reference herein in its entirety.

1. FIELD

The disclosure relates to methods and devices for transmitting and receiving hybrid multimedia data including various types of multimedia data and multimedia services in multimedia systems, and specifically, to transmitting hybrid multimedia data over hybrid networks including broadcasting networks, communication networks, or other networks.

Specifically, the disclosure relates to devices and methods for transmitting hybrid multimedia data by adopting MPEG media transport (MMT) technology.

2. DESCRIPTION OF THE RELATED ART

Recently, as MMT-related technology develops, researchers and engineers from various sectors are attending to MMT-related standardization and are actively conducting research.

To exchange data for a predetermined multimedia service between one multimedia receiver and one multimedia transmitter, a session needs to be established based on the protocol supported by the network connecting the two devices. Typically, in a mobile network the receive side sends a request for session establishment and a session key to the transmit part, and the transmit part provides the session key as requested and an IP address or port number necessary for establishing a session. Once a session is established, data exchange for the multimedia service may proceed in earnest; and for the multimedia service to last, the session also needs to last.

When one multimedia receiver (or receiving entity) and one multimedia transmitter (or sending entity) establish a session through one network and transmit a multimedia service, such a circumstance may occur so as to change the network or session in order to continue the multimedia service, as per requirements of the receiver or transmitter. As an example of changing the network, a user may desire to continue receiving the service through their home Wi-Fi network while a real-time transmission service is provided to a mobile phone over an LTE mobile communication network.

As another example situation, the LTE mobile communication network service operator may change the network to Wi-Fi, given the network condition, while a real-time media transmission service is being served to a mobile phone over an LTE mobile communication network. In both scenario cases, the session needs to be reestablished in order to continuously provide the service despite the network handover.

Meanwhile, the above-described information is provided only as background information for a better understanding of the disclosure. No determinations and claims are made as to whether what has been described in this section may be applicable as the prior art related to the present invention.

SUMMARY

When a variation is made to the network connection, the multimedia service transmission may encounter a delay or loss due to a necessary procedure performed between the receiver and the transmitter. For example, when the session is reestablished in order to change the network connection, no multimedia data is transmitted while a request message and a response message are transmitted and received between the receiver and the transmitter, as is required to establish the session. Further, unless the receiver informs the transmitter what data the receiver processed last and then provided to the user, the transmitter has difficulty figuring out the time point when it needs to resume the service when the session is reestablished. This may result in a significant performance drop in multimedia services that require being in real-time and continuity.

Accordingly, according to the present invention, there is provided a method for reducing the transmission delay and loss that may occur when the network connection changes in providing a multimedia service using an MMT system over a mobile communication network.

According to the disclosure, there is also provided a method for efficiently transmitting MMTP packets when the network connection changes while transmitting and receiving MMTP packets.

According to the disclosure, there is also provided a method for correcting errors when the network connection changes and results in an error in MMTP packet transmission and reception while transmitting and receiving MMTP packets.

According to an embodiment of the present invention, a method for receiving an MMTP packet by an MMT device comprises initiating to receive the MMTP packet from another device, detecting a changing of a network connection with the other device, determining a retransmission time in media of the MMTP packet, transmitting an MMTP control message packet to the other device, and after the network connection is changed, receiving, from the other device, the MMTP packet whose transmission resumes based on the MMTP control message packet.

According to the disclosure, a method for transmitting and receiving an MPEG media transport (MMT) protocol (MMTP) packet by an MMT receiver comprises, by the MMT receiver, establishing a network connection with an MMT transmitter to transmit and receive the MMTP packet, generating a first MMT signaling message, converting the generated first MMT signaling message into a first MMTP packet, transmitting the first MMTP packet through the established network connection, receiving a second MMTP packet through the established network connection, generating a second MMT signaling message using the second MMTP packet, receiving a third MMTP packet, and reconfiguring MPU data using the third MMTP packet and the second MMT signaling message, wherein receiving the third MMTP packet includes establishing a changed network connection based on the second MMT signaling message and receiving the third MMTP packet through the changed network connection.

According to the disclosure, a method for transmitting and receiving an MPEG media transport (MMT) protocol (MMTP) packet by an MMT transmitter comprises, by the MMT transmitter, establishing a network connection with an MMT receiver to transmit and receive the MMTP packet, receiving a first MMTP packet, reconfiguring a first MMT signaling message using the first MMTP packet, generating a second MMT signaling message based on the first MMT signaling message, transmitting a second MMTP packet into which the second MMT signaling message has been converted, and transmitting a third MMTP packet based on the second MMT signaling message, wherein transmitting the third MMTP packet includes establishing a changed network connection based on the second MMT signaling message and transmitting the third MMTP packet through the changed network connection.

According to the disclosure, an MMT receiver transmitting and receiving an MMTP packet includes a memory storing a program to transmit and receive the MMTP packet and a processor to execute the program, wherein, as the program is executed, the processor, establishes a network connection with an MMT transmitter to transmit and receive the MMTP packet, generates a first MMT signaling message, converts the generated first MMT signaling message into a first MMTP packet, transmits the first MMTP packet through the established network connection, receives a second MMTP packet through the established network connection, generates a second MMT signaling message using the second MMTP packet, receives a third MMTP packet, and reconfigures MPU data using the third MMTP packet and the second MMT signaling message, wherein receiving, by the processor, the third MMTP packet includes establishing a changed network connection based on the second MMT signaling message and receiving the third MMTP packet through the changed network connection.

According to the disclosure, an MMT transmitter transmitting and receiving an MMTP packet includes a memory storing a program to transmit and receive the MMTP packet and a processor to execute the program, wherein, as the program is executed, the processor, establishes a network connection with an MMT receiver to transmit and receive the MMTP packet, receives a first MMTP packet, reconfigures a first MMT signaling message using the first MMTP packet, generates a second MMT signaling message based on the first MMT signaling message, transmits a second MMTP packet into which the second MMT signaling message has been converted, and transmits a third MMTP packet based on the second MMT signaling message, wherein transmitting, by the processor, the third MMTP packet includes establishing a changed network connection based on the second MMT signaling message and transmitting the third MMTP packet through the changed network connection.

According to the disclosure, it is possible to reduce the transmission delay and loss that may occur when the network connection changes when providing a multimedia service using an MMT system over a mobile communication network.

According to the disclosure, when the network connection changes while MMTP packets are transmitted and received, MMTP packets may be efficiently transmitted, thus preventing additional data transmission and hence saving data traffic and processing periods.

DETAILED DESCRIPTION

Figure 1:
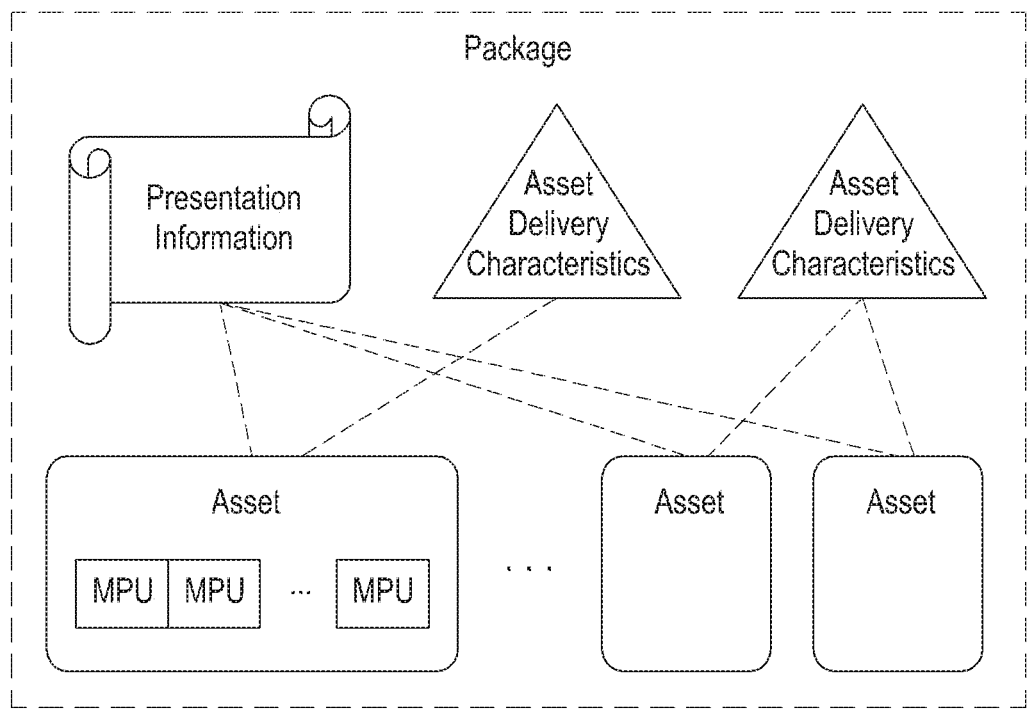
FIG. 1 is a block diagram illustrating a package according to an embodiment of the disclosure.

Hereinafter, embodiments of the present disclosure are described in detail with reference to the accompanying drawings. When determined to make the subject matter of the present disclosure unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Before detailing the present disclosure, some terms as used herein may be interpreted as follows, for example. However, it should be noted that the present disclosure is not limited thereto.

The moving picture experts group (MPEG) is a moving picture experts group aiming to standardize methods for video compression and codifying.

The MPEG media transport (MMT) is a digital container standard developed by the MPEG and this is set forth in, e.g., ISO/IEC 23008-1 (MPEG-H Part 1). The MPEG has been designed to support high-efficiency video coding, and the MMT has been designed to transmit data over all Internet protocol networks. One or more devices with MMT technology implemented therein may be called an MMT system.

The MPEG media transport protocol (MMTP) is a protocol used in MMT technology.

The terms or language used herein should not be interpreted as limited as typical ones or ones defined in the dictionary but rather to comply with the technical spirit of the present invention based on the doctrine that the inventor may define terms on his own in a proper manner so as to make the invention understood in a best way to describe best the invention.

The ordinal terms "first" and "second" are used to describe various components but are not intended to limit the components. Rather, the terms are used to distinguish one component from another. For example, a first component may be denoted as a second component, and a second component may likewise be denoted as a first component without departing from the scope of the disclosure. As used herein, the term "and/or" encompasses any or all combinations of one or more items enumerated.

The terms as used herein are provided merely to describe some embodiments thereof, but not to limit the present disclosure. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

FIG. 1 is a block diagram illustrating a package according to an embodiment of the disclosure.

Media sample refers to media data associated with one timestamp. For example, one video sample includes data for one frame of a video.

In an MMT system, a set of logical media data is referred to as a package. The MMT package includes one or more assets corresponding to the media data set, presentation information for specifying the spatial and the temporal relationship between the assets, and asset delivery characteristics containing quality-of-service (QoS) or delivery-related information necessary for transmitting the assets.

The asset is a set of media data constituting one multimedia presentation, and one asset includes one or more media processing units (MPUs) with the same asset ID. Each MPU in one asset includes asset fragments that do not overlap each other. In other words, two different MPUs do not have the same media sample.

The MPU corresponds to a unit of media data that may independently be consumed in the presentation engine of an MMT receiver (or receiving entity).

In other words, the MPU is a normal container for timed or non-timed data independently decodable. The MPU is the unit of data not restricted by the media codec. The MPU includes one or more media samples.

Processing one MPU in the MMT entity includes encapsulating/decapsulating and packetizing/de-packetizing media data in MPU units.

One MPU may be sectioned into one or more MPU fragments. An example of MPU fragment is the media fragment unit (MFU). In the disclosure, however, a movie fragment sequence number may refer to a sequence number assigned to a unit constituted of a pair of moof and mdat of FIG. 6. In one MPU, movie fragment sequence numbers may be numbered from 0, but without being limited thereto, and may be numbered in order. The MPU fragment and the movie fragment are common in that they are a fragment of an MPU and may thus be used interchangeably. In the disclosure, they are used distinctly for clarity purposes. However, using the terms distinctly does not limit the scope of the disclosure. In some cases, the movie fragment is not limited to containing one or more MPUs.

One MPU may be segmented in units of one or more data units for packetization purposes. The data unit may be the movie fragment.

One MPU may be specified with an asset ID and an MPU sequence number. The asset ID is the ID of an asset including the data contained in the MPU, and the MPU sequence number refers to the turn of the MPU in the asset containing the MPU. The MPU sequence number of the first MPU in the asset may be 0, but is not limited thereto. The MPU sequence numbers may be determined to fit the MPU order in the asset. For example, different MPUs in one asset have the same asset ID, and their respective MPU sequence numbers differ from each other. Sequential MPUs may have sequential MPU sequence numbers.

Figure 2:
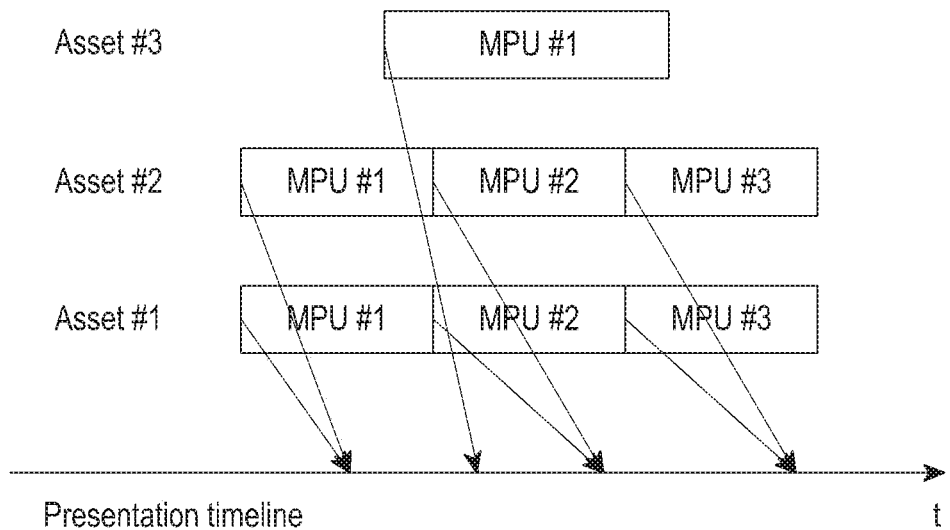
FIG. 2 is a view illustrating an example of mapping MPUs to a presentation timeline according to an embodiment of the disclosure.

FIG. 2 is a view illustrating an example of mapping MPUs to a presentation timeline according to an embodiment of the present invention.

The MPU may contain timed media data related to time as well as non-timed media data not relevant to time. For MPUs containing timed media data, one package may include presentation information for describing the relationship over the time axis between different assets and may provide the presentation information together with the MPU. For MPUs containing timed media data, presentation time information is contained in the presentation information.

To transmit one package in the MMT system, the MPUs belonging to the package are packetized in packet units, which are units appropriate for transmission according to network characteristics. In particular, the MMT system may transmit media data over a plurality of networks of various types including IP networks utilizing the MMT protocol.

To manage transmitting and consuming media data along with MMTP packets containing media data, an MMT signaling message may also be packetized into MMTP packets and transmitted.

Figure 3:
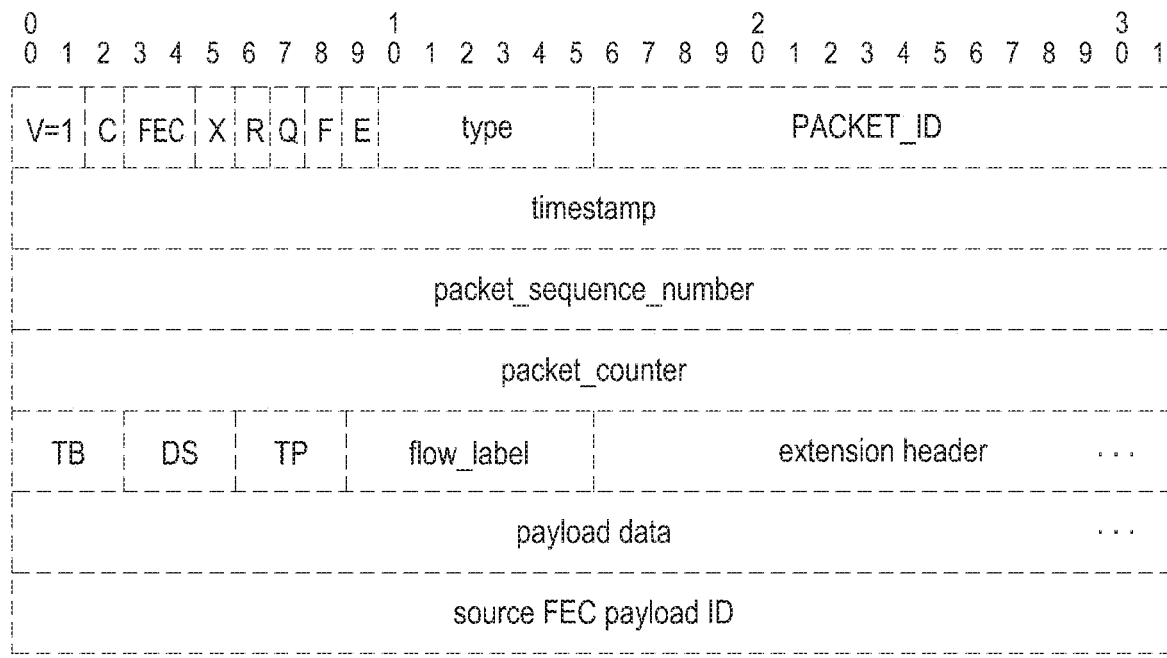
FIG. 3 is a view illustrating a structure of an MMTP packet where V=0 according to an embodiment of the disclosure.

FIG. 3 is a view illustrating a structure of an MMTP packet where V=0 according to an embodiment of the present invention.

The MMTP packet may include at least one of a packet header, a packet payload header, and a packet payload. The packet header may include information about the packet, the packet payload header may include information about the packet payload, and the packet payload may include media data.

For the MMTP packet, a packetized mode is determined in the transmission type. The MPU mode is used when streaming out media files formed in ISO base media file format, and the generic file delivery (GFD) mode is used to download media files.

Type refers to the type of packet payload data and is defined as shown in Table 1 below.

TABLE 1

| Value | Data type | Definition of data unit |
|---|---|---|
| 0x00 | MPU | a media-aware fragment of the MPU |
| 0x01 | Generic object | A generic object such as a complete MPU or an object of another type |
| 0x02 | signaling message | one or more signaling messages or a fragment of a signaling message (see sub-clause 9.2) |
| 0x03 | repair symbol | a single complete repair symbol (see Annex C.4.3) |
| 0x04~0x1F | reserved for ISO use | |
| 0x20~0x3F | reserved for private use | |

Define Data Type and Data Unit packet_id corresponds to an identifier to distinguish one asset from another. A packet_id value may be obtained from asset_id, and the relationship between the two IDs is transferred via an MMT signaling message.

packet_sequence_number allows packets with the same packet_id to be distinguished from each other.

The payload data of FIG. 3 includes a packet payload header and a packet payload. The packet payload header is described in further detail with reference to FIGS. 4 and 5.

Figure 4:
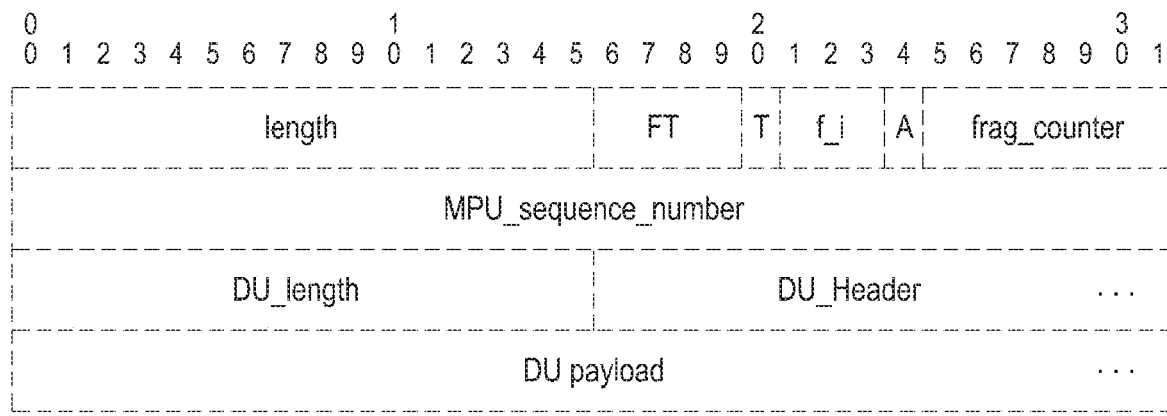
FIG. 4 is a view illustrating a structure of an MMTP payload header for an MPU mode according to an embodiment of the disclosure.

FIG. 4 is a view illustrating the structure of an MMTP payload header for an MPU mode according to an embodiment of the present invention.

In FIG. 4, length refers to the length of the payload except for the length field.

In FIG. 4, FT means the MPU fragment type.

Table 2 represents types of MPU fragment containing data included in the MMTP payload.

TABLE 2

| FT | Description | Content |
|---|---|---|
| 0 | MPU metadata | contains the ftyp, mmpu, moov, and meta boxes as well as any other boxes that appear in between. |
| 1 | Movie fragment metadata | contains the moof box and the mdat box, excluding all media data inside the mdat box but including any chunks of auxiliary sample information. |
| 2 | MFU | contains a sample or sub-sample of timed media data or an item of non-timed media data. |
| 3~15 | Reserved for private use | reserved |

Define Data Type and Data Unit

Figure 6:
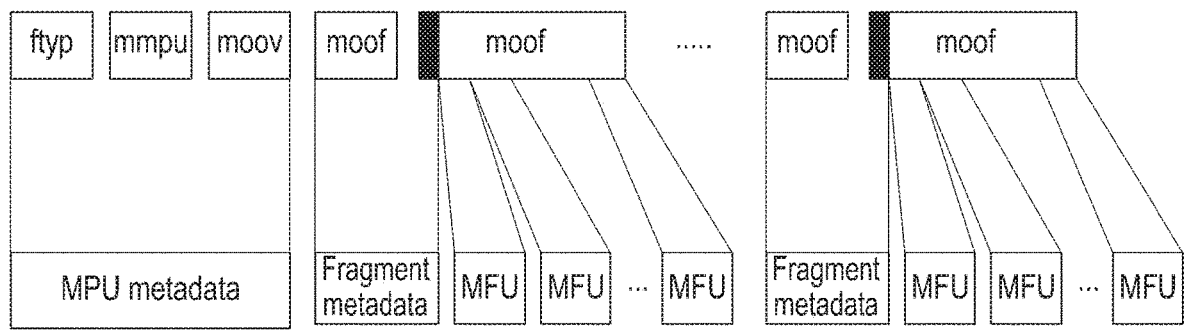
FIG. 6 is a view illustrating generating a payload for timed media according to an embodiment of the disclosure.

Marks are added on the lower part of FIG. 6 to allow the type of MPU fragment to be known, wherein MPU metadata, fragment metadata, and MFU refer to a type of MPU fragment, which matches the description of Table 2. In the disclosure, since a unit constituted of one moof and one mdat is denoted a movie fragment, the MPU fragment and the movie fragment may be distinguished from each other.

In FIG. 4, MPU_sequence_number (MPU sequence number) refers to the sequence number of an MPU in an asset. The MPU sequence number may be determined depending on the position of the MPU in the asset or depending on the presentation time of the MPU in the asset. The MPU sequence number may also mean the turn of a packet being transmitted via the MMTP.

Figure 5:
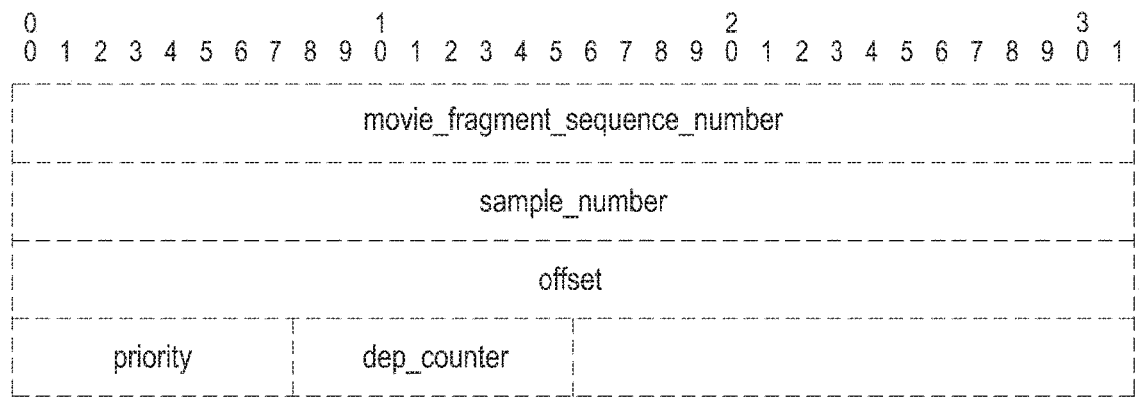
FIG. 5 is a view illustrating a DU header for a timed-media MFU according to an embodiment of the disclosure.

FIG. 5 is a view illustrating a DU header for a timed-media MFU according to an embodiment of the present invention.

FIG. 5 shows the DU_Header of FIG. 4.

The DU_Header (data unit header) of the MPU mode includes the movie fragment sequence number and the sample number.

By using the movie fragment sequence number, it may be possible to specify which movie fragment of the media file the MFU that the MMTP payload belongs to has come from.

The sample number is information that makes it possible to specify which sample the data contained in the MMTP payload is in the movie fragment that it belongs to.

In other words, the movie fragment sequence number denotes the sequence number of the movie fragment in the MPU. The sample number refers to the number of the sample contained in the movie fragment, and the MFU may include one sample. Further, the MFU may include one sub sample. The sample may include two or more sub samples.

FIG. 6 is a view illustrating generating a payload for timed media according to an embodiment of the present invention.

In the MPU mode, timed media data is separated into packets and transmitted. The MPU data, while being separated into packets, is constituted of MPU fragments, which are formed of packets as shown in FIG. 6. The MPU fragment includes MPU metadata, fragment metadata, and the MFU. The MPU meta data includes an ftyp, an mmpu, and a moov. The MPU metadata may further include a sidx. The mmpu may include an asset ID (the packet id of FIG. 3) and an MPU sequence number. The moov may include codec configuration information. That is, the components of the media file are differentiated depending on their characteristics, thereby forming the MPU.

In the MPU mode, movie fragments (movie fragment and moof and mdat pairs) may be streamed in a repeated structure. The header portions 'moof' and 'mdat' (the rest of the mdat except for the media data), which are information that should be commonly applied to the movie fragment, are defined as fragment metadata, and the portion of the 'mdat' which corresponds to the actual media data is defined as one or more MFUs.

MPU_sequence_number is information by which the MPU that the MMTP payload belongs to may be specified. As set forth above, for each MPU, the MPU presentation time is provided together, and the MPU presentation time information is delivered via an MMT signaling message.

Table 3 represents MPU timestamp descriptors.

The MPU presentation time may be delivered through the MPU time stamp descriptor.

TABLE 3

| Syntax | Value | No. of bits | Mnemonic |
|---|---|---|---|
| MPU_timestamp_descriptor ( ) { | | | |
|     descriptor_tag | | 16 | uimsbf |
|     descriptor_length | N*12 | 8 | uimsbf |
|     for (i=0; i<N; i++) { | | | |
|         mpu_sequence_number | | 32 | uimsbf |
|         mpu_presentation_time | | 64 | uimsbf |
|     } | | | |
| } | | | |

MPU Timestamp Descriptor

Using the mpu_sequence_number of Table 3, the MPU may be specified. mpu_presentation_time means the time when the mpu is presented. The mpu_presentation_time may be determined with respect to the NTP timestamp format.

Figure 7:
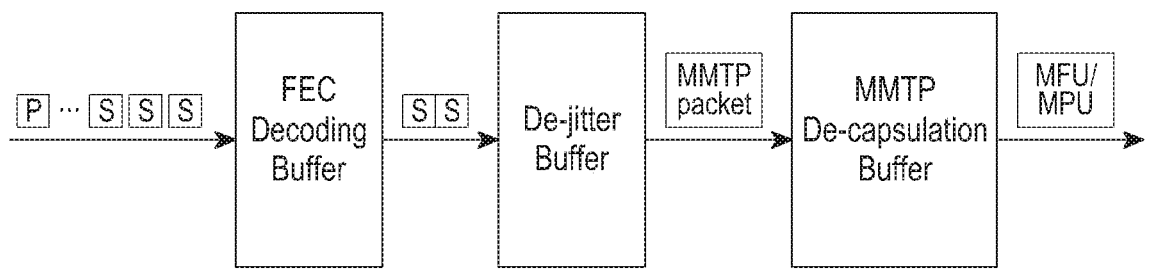
FIG. 7 is a view illustrating an MMT protocol virtual receiver model according to an embodiment of the disclosure.

FIG. 7 is a view illustrating an MMT protocol virtual receiver model according to an embodiment of the present invention.

For efficient media data transmission in the MMT system, the MMT receiver (MMT sending entity, MMT transmitter, MMT receiver), fixed end-to-end delay, and limited MMT receiver (MMT receiving entity, MMT receiver) memory may be assumed. Such a memory may be referred to as an MMT hypothetical receiving buffer, and a model using the same is denoted an MMT hypothetical receiver buffer model (MMT HRBM). The MMT HRBM may be configured as shown in FIG. 7. The forward error correction (FEC) decoding buffer corresponds to a buffer that should store MMTP packets in the memory until sufficient source data and repair symbol data for FEC decoding are gathered where the MMT system supports FEC.

The de jitter buffer corresponds to a buffer that assists in making MMTP packets able to reach the fixed end-to-end delay by only storing MMTP packets that arrive within the maximum transmission delay.

The MMTP packet decapsulation buffer corresponds to a buffer necessary to configure one data unit by combining one or more payload data and removing the MMTP payload header and MMTP packet header before sending out the MMTP packet payload data to the higher layer. Accordingly, one MFU payload, one movie fragment, and one MPU data may be generated using the MMTP packet decapsulation buffer.

The MMT transmitter (MMT sending entity) predicts the fixed end-to-end delay and buffer size and transfers the predicted fixed end-to-end delay and buffer size to the MMT receiver (MMT receiving entity) via the MMT signaling message. For accurate prediction, the MMT transmitter and the MMT receiver communicate relevant information.

Equation 1 represents the fixed end-to-end delay and the buffer size.

fixed end-to-end delay=maximum transmission delay+FEC buffering time buffer size=(maximum delay−minimum delay)*maximum bitrate     Equation 1

When the FEC decoding buffer is not used, the FEC buffering time is not taken into consideration.

The fixed end-to-end delay and the buffer size may be contained in the HRBM message. The HRBM message may be contained in the MMT signaling message.

Table 4 represents the HRBM message.

TABLE 4

| Syntax | Values | No. of bits | Mnemonic |
| --- | --- | --- | --- |
| HRBM ( ){ | | | |
|   message_id | | 16 | |
|   Version | | 8 | |
|   Length | | 16 | |
|   extension { | | | |
|     extension_fields_Byte | | | |
|   } | | | |
|   message_payload{ | | | |
|     max_buffer_size | | 32 | |
|   fixed_end_to_end_delay | | 32 | |
|   max_transmission_delay | | 32 | |
|   } | | | |
| } | | | |

HRBM Message Syntax

Figure 8:
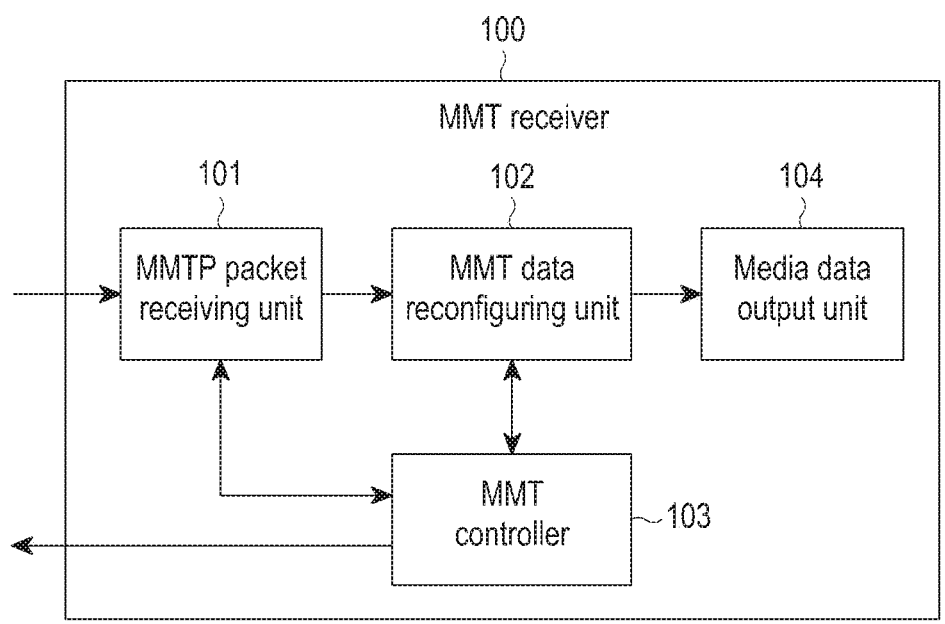
FIG. 8 is a block diagram illustrating an MMT receiver according to an embodiment of the disclosure.

FIG. 8 is a block diagram illustrating an MMT receiver (MMT receiving entity) according to an embodiment of the present invention.

The MMT receiver 100 may include at least one of an MMTP packet receiving unit 101, an MMT data reconfiguring unit 102, an MMT controller 103, and a media data output unit 104.

The MMT receiver 100 may include one or more processors and memories. The processors may be controllers.

The MMTP packet receiving unit 101 allows the MMT receiver to receive MMTP packets from the MMT transmitter. The type of payload data contained in the MMTP packet may be distinguished by identifying the type information in the MMTP packet header. When the payload data type is MPU, it may be delivered to the MMT data reconfiguring unit 102, and when the payload data type is an MMT signaling message, it may be delivered to the MMT controller 103.

The MMTP packet receiving unit 101, despite its name, may include a transceiver.

The MMT data reconfiguring unit 102 and the MMT controller 103 may include a processor.

When the network connection with the MMT transmitter varies while the MMT receiver 100 is receiving MMTP packets, the MMTP packet receiving unit 101 may transfer the packet ID and packet sequence number of the one last received to the MMT controller 103.

The MMT data reconfiguring unit 102 restores the MMTP payload data received from the MMTP packet receiving unit 101 into one MMT data. At this time, the MMT signaling message received from the MMT controller 103 is used to restore into the MMT data. In order to restore, the received MMTP payload data typically lie in MPU fragment units (MFUs).

As per the request from the MMT receiver, the MMT data reconfiguring unit may deliver to the media data output unit 104 1) whenever one MPU is reconfigured (MPU mode), 2) whenever one movie fragment is reconfigured (movie fragment mode), or 3) whenever one MFU is reconfigured (MFU mode).

When a variation is made to the network connection with the MMT transmitter while the MMT receiver 100 is receiving MMTP packets, the MMT data reconfiguring unit 102 may transfer the MPU presentation time of the MPU when the payload data currently being reconfigured belongs to the MMT controller 103. As set forth above, the MPU presentation time refers to the start time when the MPU plays back and may be represented in network time protocol (NTP) or universal time coordinated (UTC) format. Accordingly, although different packet configuration processes are applied to media data encoded under the same condition, the output time from the MMT receiver remains the same. For example, even when, after one encoded media data is configured as MPUs, they are MMTP packetized by two different MMTP packet configuration methods and transmitted, the output times of the MPUs restored in the MMT receiver are the same.

When the network connection with the MMT transmitter is varied while the MMT receiver 100 is receiving MMTP packets, the MMT data reconfiguring unit 102 may deliver the MPU sequence number containing the payload data and sample number and the movie fragment sequence number of the movie fragment when the payload data currently being reconfigured belongs to the MMT controller 103.

The MMT controller 103 receives the payload data corresponding to the MMT signaling message among the MMTP packets, which the MMTP packet receiving unit 101 receives from the MMT transmitter 200.

When the network connection with the MMT transmitter 200 is varied while the MMT receiver 100 is receiving MMTP packets, the MMT controller may transmit a network change flag, thereby informing the MMT transmitter 200 that the network connection between the MMT receiver 100 and the MMT transmitter 200 is to be changed from the first network to the second network after the current time. If the network change is complete, the network change flag value is changed, thereby informing the MMT transmitter 200 that the change has been completed.

Further, as set forth above, at least one of the packet ID, packet sequence number, MPU presentation time, movie fragment sequence number, sample number, and MPU sequence number may be transmitted to the MMT transmitter.

The media data output unit 104 corresponds to a part that transfers the reconfigured MMT data to a higher layer including the application layer. Further, the media data output unit 104 may execute all of the process in order to show the user the media data. For example, the media data output unit 104 may include a processor to control media data and may further include a display device to display to the user.

Figure 9:
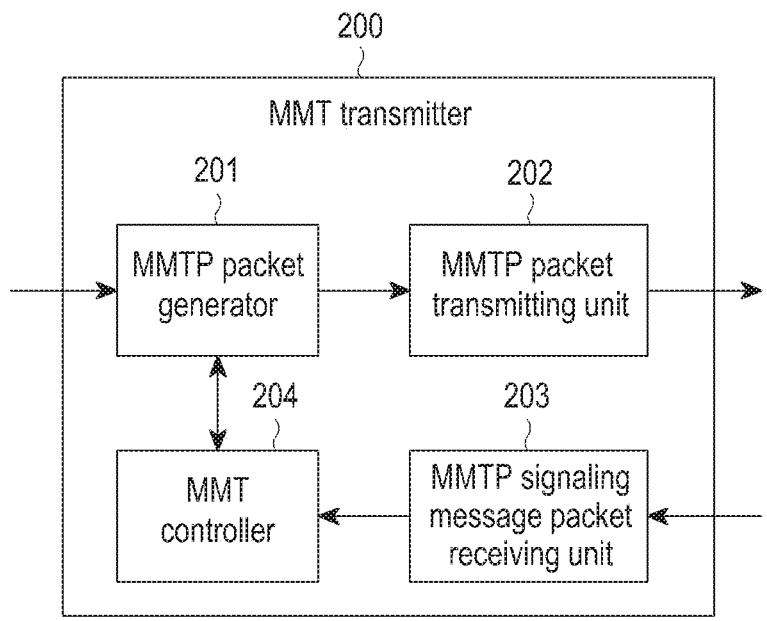
FIG. 9 is a block diagram illustrating an MMT transmitter according to an embodiment of the disclosure.

FIG. 9 is a block diagram illustrating an MMT transmitter according to an embodiment of the disclosure.

The MMT transmitter 200 may include at least one of an MMTP packet generator 201, an MMTP packet transmitting unit 202, an MMT signaling message packet receiving unit 203, and an MMT controller 204.

The MMTP packet generator 201 produces MMTP packets so that it is able to transmit MMT data, such as MPU or signaling messages, to the MMT receiver 100 using MMTP. The produced MMTP packets are transmitted to the MMT receiver 200 by the MMTP packet transmitting unit 202.

Similar to the MMT receiver 100, the MMT transmitter 200, when there is a variation to the network connection with the MMT receiver 100, may produce an MMT signaling message including a network change flag and a network change delay. The network change delay means a time delay given the time required to the network change. When the network change flag and the network change delay are varied, the MMTP packet generating process and the MMT packet transmitting process are varied as well. Based on the varied network change flag and network change delay, the MMTP packet may previously be transmitted through the first network or may be transmitted later through the second network.

The MMTP packet transmitting unit 202 transmits generated MMTP packets to the MMT receiver 100.

The MMTP signaling message packet receiving unit 203 receives MMTP packets including MMT signaling messages from the MMT receiver 100.

Similar to the MMT receiver 100, when a variation is made to the network connection with the MMT receiver, information is received to specify the last packet that the MMT receiver received or to specify the last MMT data that it reconfigured. The information is delivered, as an MMT signaling message, to the MMT controller 204.

The MMT controller 204 controls the MMTP packet generator 201 to change MMT data into packets using the MMT signaling message. In particular, when a change is made to the network connection with the MMT receiver, it indicates the time of MMT data that the MMT transmitter 200 should start transmitting over the new network connection.

Figure 10:
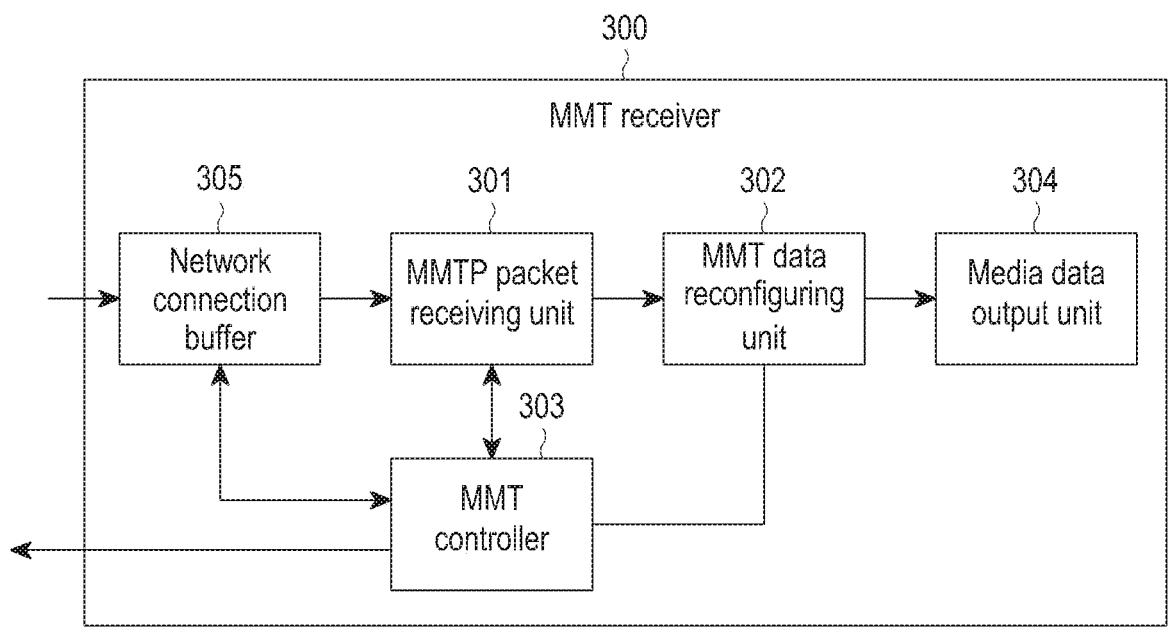
FIG. 10 is a block diagram illustrating an MMT receiver according to another embodiment of the disclosure.

FIG. 10 is a block diagram illustrating an MMT receiver according to another embodiment of the disclosure.

The MMT receiver 300 may include at least one of an MMTP packet receiving unit 301, an MMT data reconfiguring unit 302, an MMT controller 303, a media data output unit 304, and a network connection buffer 305.

For the network connection buffer 305, when the network connection with the MMT transmitter 200 changes from the first network to the second network while the MMT receiver 300 receives MMTP packets, the MMT transmitter may transmit buffer information considering the time required for the network change to the MMT receiver 300 in an MMT signaling message. The MMT signaling message may be delivered from the MMTP packet receiving unit 301 to the MMT controller 303, allowing the MMT receiver 300 to generate the network connection buffer.

At this time, in order to be able to generate the network connection buffer, the MMT signaling message may contain a network change flag and a network change delay.

When the network change flag is 1, the MMT receiver 300 may predict that there will be a change in network connection. The MMT transmitter 200 may calculate the number of packets that may be transmitted until the network change delay, which is the predicted time delay of the network connection change. Based on the calculated number of transmittable packets, the actual number of packets supposed to be transmitted is determined. For example, when the network change delay is 100 ms, and the number of packets transmittable for 100 ms is 100, the number of packets actually transmitted may be set to 50 for safe transmission. This may be calculated previously and experimentally. Further, packets currently waiting for transmission may be considered. For example, if the number of packets transmittable during the network change delay is 100 and the number of packets waiting for transmission is 70, no packets to be additionally transmitted may be produced.

Further, the MMT data configuration may further be taken into account. For example, if the number of packets transmittable during the network change delay is 100, the number of packets to be transmitted is set to 50, the number of packets currently waiting for transmission is 120, and the 120 packets consist of 50 packets of a first MPU, 40 packets of a second MPU, and 30 packets of a third MPU, since 50 packets are set to be transmitted and all the packets cannot be transmitted, the maximum possible number of packets (the packets of the first MPU) may be chosen so that, during the network change delay, only the packets of the first MPU are transmitted and the packets of the second MPU and the third MPU are not.

When the network change flag is 1, the MMT receiver 300 may prepare for a network connection buffer corresponding to the network change delay that the MMT transmitter 200 provided, and if the network change flag becomes zero, it may release the buffer, shortening the time until media data is output. For example, if the network change flag is 1, it may prepare for a network connection buffer as per the network change delay, and if the network change flag becomes zero, it may enable the network connection buffer to not be used.

If the MMT receiver 300 identifies the network change being complete, the MMT receiver 300 may release the network connection buffer before receiving the network change flag from the MMT transmitter 200.

As shown in FIG. 10, the network connection buffer 305 may be placed ahead of the MMTP packet receiving unit 301. However, the network connection buffer 305 may also be placed between the MMT data reconfiguring unit 302 and the media data output unit 304.

The network connection buffer 305 may be applied as an additional buffer independently from the HRBM, or may be included as part of the HRBM. Resultantly, the network connection buffer 305 agreed upon by the MMT transmitter 200 and the MMT receiver 300 is set given the maximum transmission delay, FEC buffering time, and network change delay.

The description of the MMT receiver 100 of FIG. 8 may apply to the MMTP packet receiving unit 301, the MMT data reconfiguring unit 302, the MMT controller 303, and the media data output unit 304.

Figure 11:
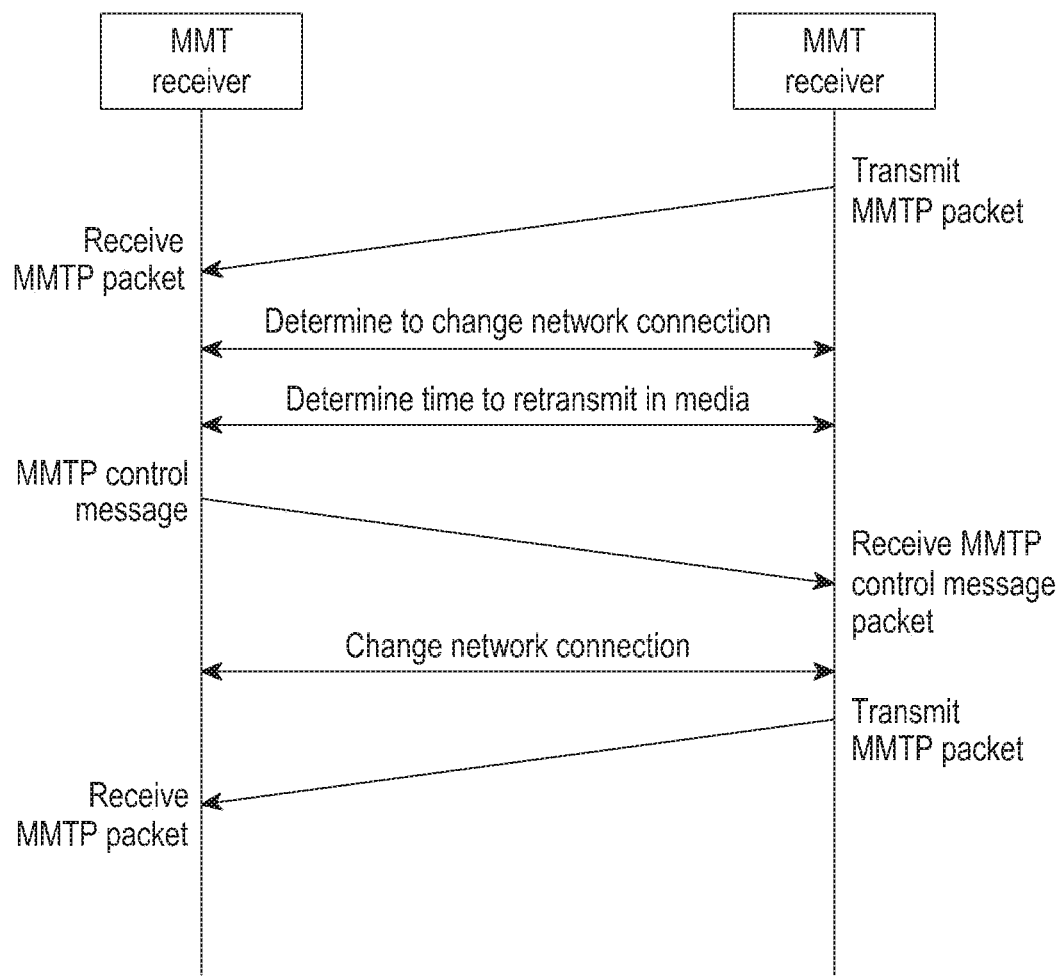
FIG. 11 is a flowchart illustrating operations of an MMT receiver and an MMT transmitter according to an embodiment of the disclosure.

FIG. 11 is a flowchart illustrating operations of an MMT receiver and an MMT transmitter according to an embodiment of the present invention.

The MMT transmitter may transmit MMTP packets to the MMT receiver, and the MMT receiver may receive the MMTP packets transmitted.

Changing the network connection configuration between the MMT receiver and the MMT transmitter may be determined. At this time, the MMT receiver may send a network change request to the MMT transmitter, and conversely, the MMT transmitter may send a network change request to the MMT receiver.

Based on the network change request, the retransmission time of the media may be determined.

Further, the MMT receiver may transmit an MMTP signaling message, and the MMT transmitter may receive the MMTP signaling message. Based on the received MMTP signaling message, the network connection may be changed, and the MMT transmitter transmits MMTP packets to the MMT receiver using the changed network.

Figure 12:
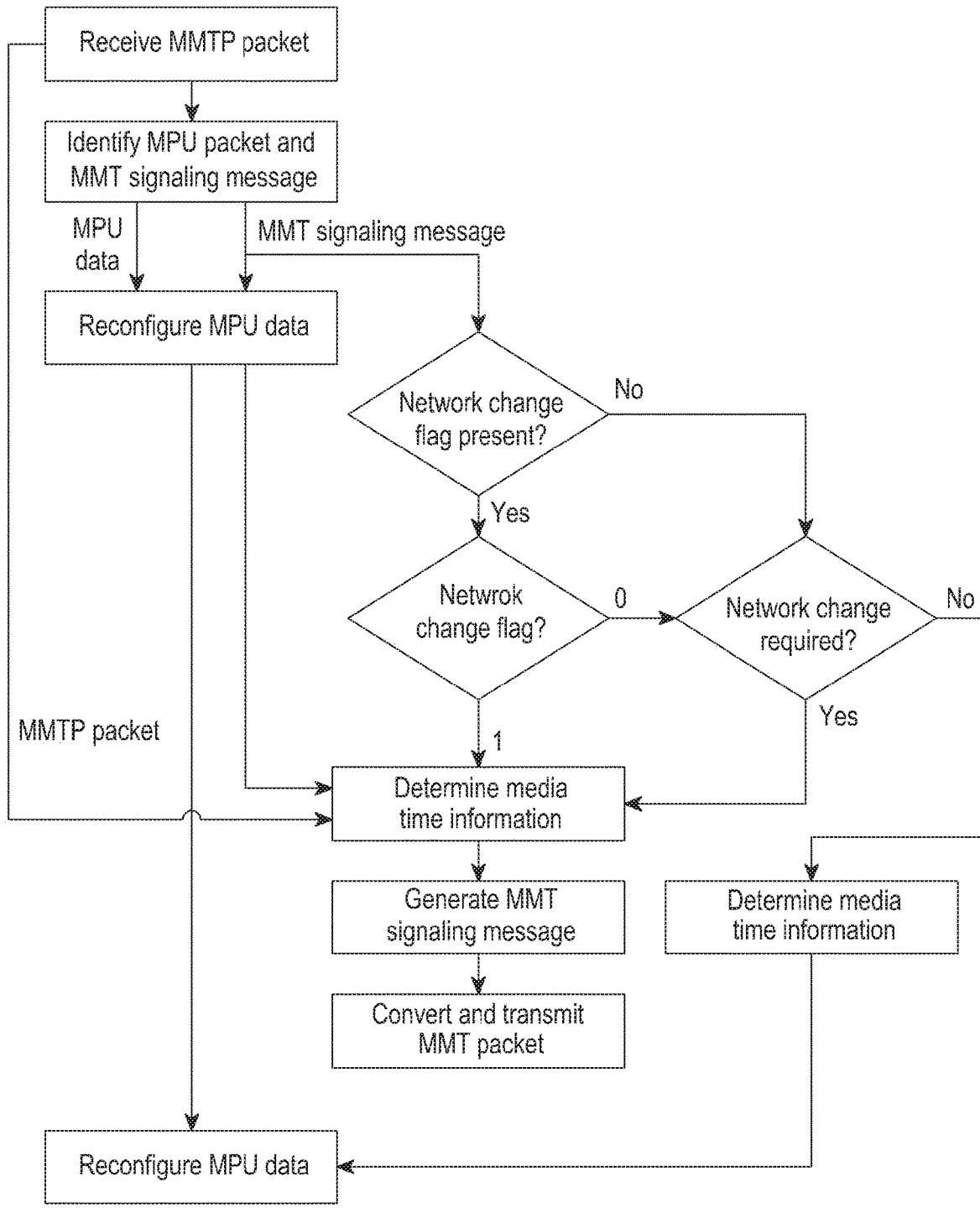
FIG. 12 is a flowchart illustrating operations of an MMT receiver according to an embodiment of the disclosure.

FIG. 12 is a flowchart illustrating operations of an MMT receiver according to an embodiment of the present invention.

The MMT receiver may receive MMTP packets.

The MMT receiver identifies MPU data and the MMT signaling message.

The MMT receiver may reconfigure the MPU data using the identified MPU data and MMT signaling message. The media data may be output using the reconfigured MPU data.

The MMT receiver identifies the presence or absence of a network change flag from the identified MMT signaling message.

Upon identifying that there is a network change flag, the MMT receiver identifies whether the network change flag indicates a network change.

If there is no network change flag or the network change flag does not indicate a network change, the MMT receiver may determine whether a network change is needed.

Upon determining that the network change flag indicates a network change or that a network change is needed, the MMT receiver produces media time information to be used after the network connection is changed.

The media time information may be determined from the received MMTP packet and the MPU data to be reconfigured, considering the status and characteristics of the MMT transmitter and MMT receiver and the status and characteristics of the first network and second network.

The MMT receiver, after determining the media time information, may produce an MMT signaling message.

The produced MMT signaling message is converted into packets using MMTP that are then transmitted.

Figure 13:
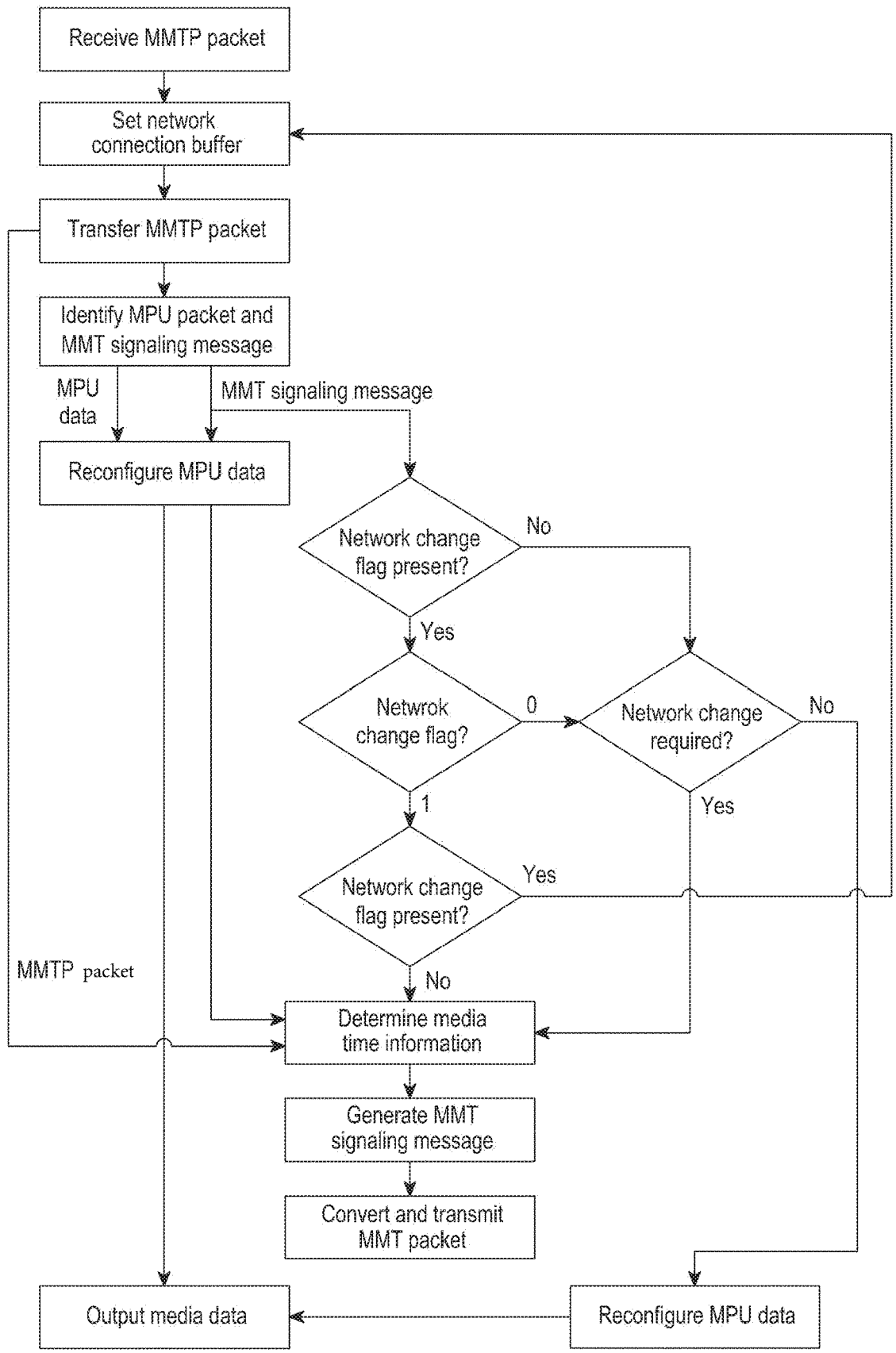
FIG. 13 is a flowchart illustrating operations of an MMT receiver according to another embodiment of the disclosure.

FIG. 13 is a flowchart illustrating operations of an MMT receiver according to another embodiment of the present invention.

The MMT receiver 300 may receive MMTP packets.

The MMT receiver 300 may set a network connection buffer considering the network change delay.

The MMT receiver 300 may transfer MMTP packets to the MMTP packet receiving unit 301.

The MMT receiver 300 may identify MPU data and the MMT signaling message.

The MMT receiver 300 may reconfigure the MPU data using the identified MPU data and the MMT signaling message. The media data may be output using the reconfigured MPU data.

The MMT receiver 300 identifies the presence or absence of a network change flag from the identified MMT signaling message.

Upon identifying that there is a network change flag, the MMT receiver 300 may identify whether the network change flag indicates a network change.

If there is no network change flag or the network change flag does not indicate a network change, the MMT receiver 300 may determine whether a network change is needed.

Upon determining that the network change flag indicates a network change or that a network change is needed, the MMT receiver 300 may determine whether there is a network change delay. If there is a network change delay, the network connection buffer may be set based on the network change delay. Media time information to be used after changing the network connection is produced based on the set network connection buffer.

The media time information may be determined from the received MMTP packet and the MPU data to be reconfigured, considering the status and characteristics of the MMT transmitter and MMT receiver and the status and characteristics of the first network and the second network.

The MMT receiver 300, after determining the media time information, may produce an MMT signaling message.

The produced MMT signaling message is converted into packets using MMTP that are then transmitted.

Figure 14:
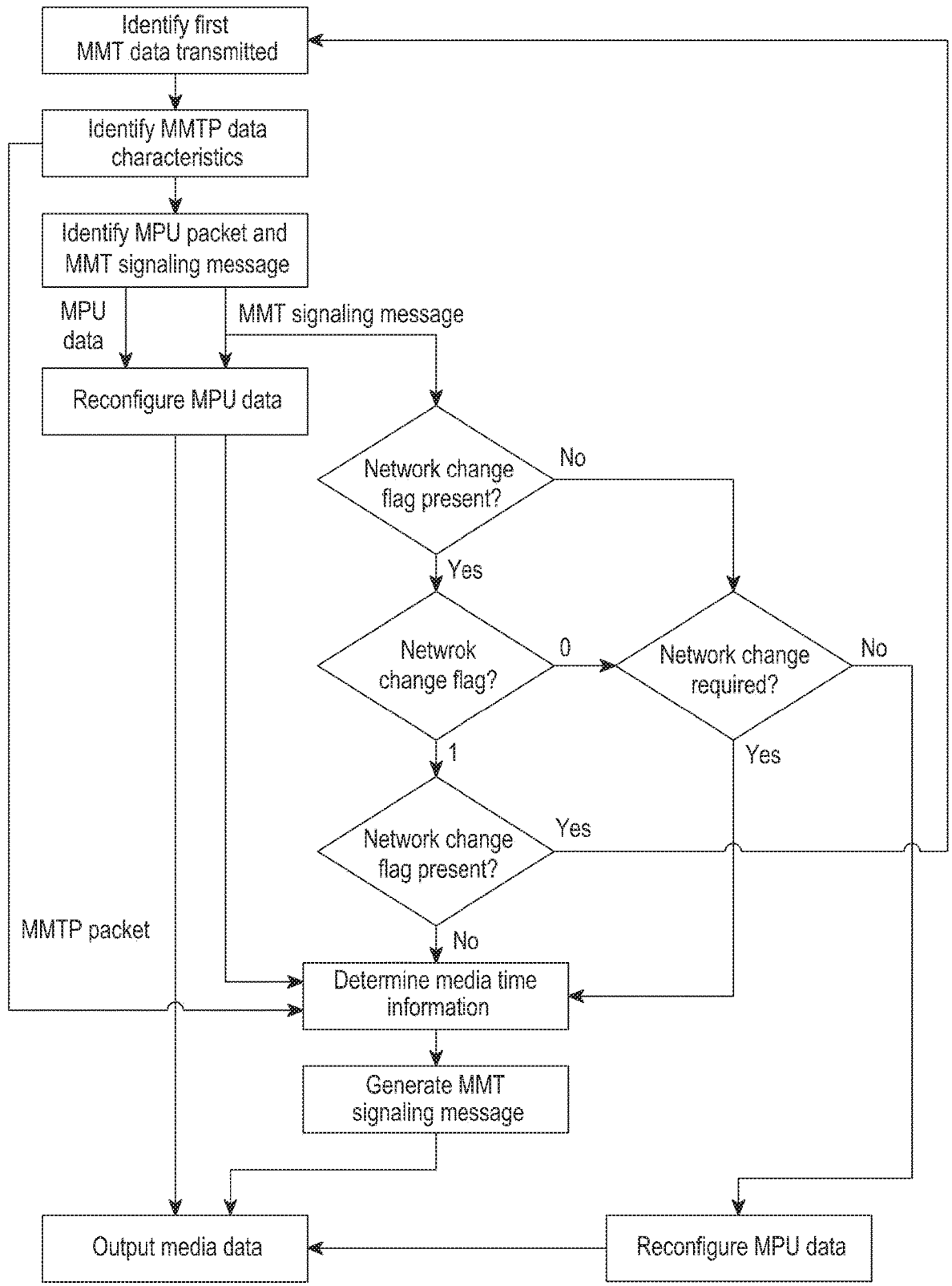
FIG. 14 is a flowchart illustrating operations of an MMT transmitter according to an embodiment of the disclosure.

FIG. 14 is a flowchart illustrating operations of an MMT transmitter according to an embodiment of the present invention.

Referring to FIG. 14, the MMT transmitter may identify first MMT data to be transmitted.

The MMT transmitter may identify the first MMT data to be transmitted.

Further, the MMT transmitter may identify the characteristics of the MMT data.

Further, the MMT transmitter may identify the MPU data and MMT signaling message.

The MMT transmitter may determine whether the network change flag indicates a network change from the identified MMT signaling message.

If there is no network change flag or the network change flag does not indicate a network change, the MMT transmitter may determine whether a network change is needed.

Upon determining that the network change flag indicates a network change or that a network change is needed, the MMT transmitter may determine whether there is media transmission time information.

When there is media transmission time information, the first MMT data may be identified.

Upon determining that the network change flag indicates a network change or that a network change is needed, the MMT transmitter may determine the network change flag and network change delay from the MPU data considering the status and characteristics of the first network and second network and the status and characteristics of the MMT receiver and the MMT transmitter.

The MMT transmitter may produce an MMT signaling message.

The MMT transmitter may convert into packets by using MMTP using the identified MPU data and MMT signaling message and transmit the same.

Figure 15:
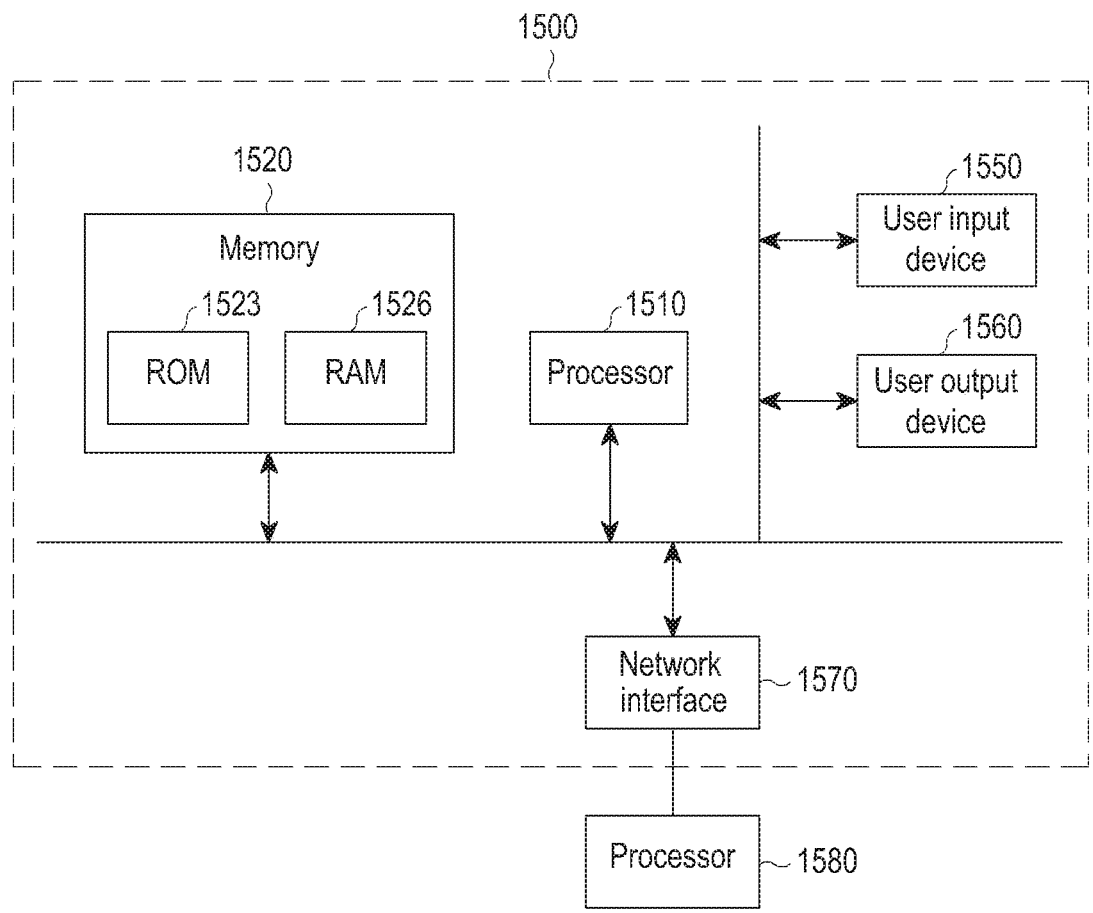
FIG. 15 is a view illustrating an example for describing a configuration of a computer system where a method for transmitting and receiving MMTP packets is implemented, according to an embodiment of the disclosure.

FIG. 15 is a view illustrating an example for describing a configuration of a computer system in which a method for transmitting and receiving MMTP packets is implemented, according to the disclosure.

Meanwhile, a method for transmitting information in an MMT system, according to an embodiment of the disclosure, may be implemented on a computer system 1500 or recorded in a recording medium. Referring to FIG. 1, the computer system 1500 may include at least one or more processors 1510 and a memory 1520.

The processor 1510 may be a central processing unit (CPU) or a semiconductor device that processes commands stored in the memory 1520.

The processor 1510 may be a controller to control all the operations of the computer system 1500. The controller may execute the operations of the computer system 1500 by reading and running the programming code out of the memory 120.

The computer system 1500 may further include at least one of a user input device 150, a data communication bus 1530, and a user output device 1560. The above-described components may perform data communication through the data communication bus 130.

The computer system 1500 may further include a network interface 1570 connected to the network 1580.

The memory 1520 may include various types of volatile or non-volatile storage media. For example, the memory 1520 may include a read only memory 1523 and a random access memory 1526.

Accordingly, a method for transmitting information in an MMT system, according to an embodiment of the disclosure, may be implemented in such a manner as to be able to run on a computer. According to an embodiment of the disclosure, when a method for transmitting and receiving MMTP packet is performed on a computer device, computer readable commands may perform the operation method according to the present invention.

Meanwhile, a method for transmitting information in an MMT system, according to the disclosure as described above, may be implemented in codes that a computer may read out of a recording medium, according to an embodiment. The computer-readable recording medium includes all types of recording media storing data that can be read out or interpreted by the computer system 1500. For example, the computer-readable recording medium may include a ROM, a RAM, a magnetic tape, a magnetic disc, a flash memory, and an optical data storage device. Further, the computer-readable recording medium may be distributed on the computer system 1500 connected via the computer communication network and may be stored and run as code readable in a distributive manner.

Table 5 represents the MMT transition request (MTR) message.

TABLE 5

| Syntax | Value | No. of bits | Mnemonic |
|---|---|---|---|
| MTR_message ( ) { | | | |
|   message_id | | 16 | uimsbf |
|   version | | 8 | uimsbf |
|   length | | 16 | uimsbf |
|   message_payload{ | | | |
|     IP_version | | 2 | bslbf |
|     reserved | '11 1111' | 6 | bslbf |
|     if (IP_version == 00) { | | | |
|       origin_address | | 32 | uimsbf |
|       transition_ address | | 32 | uimsbf |
|     } | | | |
|     else if (IP_version== 01) { | | | |
|       origin_ address | | 128 | uimsbf |
|       transition_ address | | 128 | uimsbf |
|     } | | | |
|     origin_port_number | | 16 | uimsbf |
|     transition_port_number | | 16 | uimsbf |
|     MMT_package_id { | | | |
|       MMT_package_id_length | N1 | 8 | uimsbf |
|       for (i=0; i<N1; i++) { | | | |
|         MMT_package_id_byte | | 8 | uimsbf |
|       } | | | |
|     } | | | |
|     number_of_assets | N2 | 8 | uimsbf |
|     for (i=0; i<N2; i++) { | | | |
|       asset_id( ) | | | |
|       packet_id | | 16 | uimsbf |
|       packet_sequence_number | | 32 | uimsbf |
|       mpu_sequence_number | | 32 | uimsbf |
|       mpu_presentation_time | | 64 | uimsbf |
|       sample_flag | | 1 | bslbf |
|       if (sample_flag == 1) { | | | |
|         movie_fragment_sequence_number | | 32 | uimsbf |
|         sample_number | | 32 | uimsbf |
|       } | | | |
|     } | | | |
|   } | | | |
| } | | | |

The MMT transition request message is a type of MMT signaling message, which is sent from the MMT receiver (MMT receiving entity) to the MMT transmitter (MMT sending entity).

The MMT transition request message is used upon changing the package delivery path.

For example, the MMT receiver may change the network connection into Wi-Fi considering the data limit while using LTE. When the network interface used is changed, the delivery path from the MMT receiver to the MMT transmitter is changed.

If the MMT receiver transfers information (origin_address, origin_port_number) about the network currently being used and information (transition_address, transition_port_number) about the network to be changed the MMT transmitter, the MMT transmitter may be aware of the information about the network to be changed. The origin_address may mean the IP address of the MMT receiver before change. The origin_port_number may mean the port number of the MMT receiver before change. In contrast, the transition_address and the transition_port_number may mean the IP address and port number, respectively, of the MMT receiver after network change.

Further, the MMT receiver transmits the packet ID (packet_id), packet sequence number (packet_sequence_number), the MPU sequence number (mpu_sequence_number), MPU presentation time (mpu_presentation_time), movie fragment sequence number (movie_fragment_sequence_number), and sample number (sample_number) to the MMT transmitter. After the delivery path changes, the MMT transmitter determines the MPU, movie fragment, and sample to be subsequently transmitted to the MMT receiver and transmits the determined MPU, movie fragment, and sample.

For quick transmission, media data may simultaneously be received for two or more assets. At this time, the MTR message may include as many packet_id's, packet_squence_number's, mpu_squence_number's, mpu_presentation_time's, movie_fragment_sequence_number's and sample_number's as the number of the two or more assets. For each asset, the MMT receiver may subsequently receive the data that it was receiving after the network connection change.

Table 6 represents the MMT transition notification (MTN) message.

TABLE 6

| Syntax | Value | No. of bits | Mnemonic |
| --- | --- | --- | --- |
| MTN_message ( ) { | | | |
|     message_id | | 16 | uimsbf |
|     version | | 8 | uimsbf |
|     length | | 16 | uimsbf |
|     message_payload{ | | | |
|         transition_request_flag | | 1 | bslbf |
|         reserved | '111 1111' | 7 | bslbf |
|         if (transition_request_flag == 1) { | | | |
|             IP_version | | 2 | bslbf |
|             reserved | '11 1111' | 6 | bslbf |
|             if (IP_version == 00) { | | | |
|                 origin_ address | | 32 | uimsbf |
|                 transition_ address | | 32 | uimsbf |
|             } | | | |
|             else if (IP_version == 01) { | | | |
|                 origin_ address | | 128 | uimsbf |
|                 transition_ address | | 128 | uimsbf |
|             } | | | |
|             origin_port_number | | 16 | uimsbf |
|             transition_port_number | | 16 | uimsbf |
|             transition_start_time | | 32 | uimsbf |
|             origin_end_time | | 32 | uimsbf |
|         } | | | |
|         else if (transition_request_flag == 0) { | | | |
|             IP_version | | 2 | bslbf |
|             reserved | '11 1111' | 6 | bslbf |
|             if (IP_version == 00) { | | | |
|                 origin_ address | | 32 | uimsbf |
|                 transition_ address | | 32 | uimsbf |
|             } | | | |
|             else if (IP_version == 01) { | | | |
|                 origin_ address | | 128 | uimsbf |
|                 transition_ address | | 128 | uimsbf |
|             } | | | |
|             origin_port_number | | 16 | uimsbf |
|             transition_port_number | | 16 | uimsbf |
|             transition_scheduled_flag | | 1 | bslbf |
|             reserved | '111 1111' | 7 | bslbf |
|             if (transition_scheduled_flag == 0) { | | | |
|                 MMT_general_location_info( ) | | | |
|             } | | | |
|             else if (transition_scheduled_flag == 1) { | | | |

TABLE 6-continued

| Syntax | Value | No. of bits | Mnemonic |
|---|---|---|---|
|         transition_start_time | | 32 | uimsbf |
|         origin_end_time | | 32 | uimsbf |
|       } | | | |
|   } | | | |
| MMT_package_id { | | | |
|     MMT_package_id_length | N1 | 8 | uimsbf |
|     for (i=0; i<N1; i++) { | | | |
|         MMT_package_id_byte | | 8 | uimsbf |
|     } | | | |
| } | | | |
| number_of_assets | N2 | 8 | uimsbf |
| for(i=0; i<N2; i++) { | | | |
|     asset_id( ) | | | |
|     packet_id | | 16 | uimsbf |
|     packet_sequence_number | | 32 | uimsbf |
|     mpu_sequence_number | | 32 | uimsbf |
|     mpu_presentation_time | | 64 | uimsbf |
|     reserved | '1111 111' | 7 | bslbf |
|     sample_flag | | 1 | bslbf |
|     if (sample_flag == 1) { | | | |
|         movie_fragment_sequence_number | | 32 | uimsbf |
|         sample_number | | 32 | uimsbf |
|     } | | | |
|   } | | | |
| } | | | |

The MMT transition notification message is a type of MMT signaling message, which is sent from the MMT transmitter (MMT sending entity) to the MMT receiver (MMT receiving entity).

The MMT transmitter receives the MTR message from the MMT receiver, and in response thereto, may transmit an MTN message. However, even without receiving the MTR message from the MMT receiver, the MMT transmitter may send the MTN message to the MMT receiver when it needs to change the delivery path.

The MTN message contains information regarding the package to be transmitted after the MMT delivery path changes, the asset, MPU, movie fragment, and sample. However, the MMT receiver may directly produce the packet_id, packet_sequence_number, mpu_sequence_number, movie_fragment_sequence_number, and sample_number, which are contained in the MTR message, based on the received media data. The MMT transmitter may produce an MTN message using the information contained in the MTR message received from the MMT receiver.

The MMT transmitter may set information related to the package, asset, packet, and sample, by considering the transition time. The transition time may be determined given the delay required to change the network connection. In other words, given the delay required to change the network connection, the amount of packets transmittable over the pre-change network may be predicted, the packet_sequence_number, mpu_sequence_number, movie_fragment_sequence_number, and sample_number values are set, and the MTN message is produced. The MMT transmitter may send the produced MTN message to the MMT receiver. The MMT receiver may receive packets up to the packet_sequence_number, mpu_sequence_number, movie_fragment_sequence_number, and sample_number as set, and then change the network connection and receive subsequent packets using the changed network connection.

The MMT transmitter may transmit packets as per set values, and after the network connection changes, may transmit subsequent packets over the changed network connection.

Further, the MMT transmitter may hand responsibility over to another MMT transmitter. The MMT transmitter may allow the MMT receiver to establish a network connection with the other MMT transmitter by providing location information about the other MMT transmitter to the MMT receiver.

The MTN message defines the transition time using information about the last data received. The transition time may be described by three types of information. The three types of information refer to the packet, MPU, and sample. The transition time may be determined using the MTR message and the MTN message. The transition time means the time when media which used to be transmitted is retransmitted by, e.g., reestablishment of a connection between the MMT entities. In other words, this means the starting time of delivery through the new delivery path, and is the same as the end time of delivery through the original delivery path.

If the transition time can be precisely predicted, the transmission of packets, MPUs, and samples for which the network connection is changed may be scheduled more precisely, and data is repeatedly transmitted.

For an accurate prediction of the transition time, the MMT receiver may transmit additional information about assets, packets, and samples to the MMT transmitter. In the packetization stage, the packet ID and packet sequence number would help predicting the transition time. In the MPU production stage, the MPU sequence number and MPU presentation time would contribute to predicting the transition time. Although the MPU sequence number and the MPU presentation time differ in packetizing characteristics and MPU configuration characteristics, accurate positioning is possible in MPU units. If the same encoding is used, precise positioning is possible despite using a protocol other than the MMTP. If even a movie fragment has been produced, the transition time may be predicted using the MPU sequence number, movie fragment sequence number, and sample number. Since it is a time defined in the encoded media standard, the location of the media may be precisely known regardless of the transport protocol or MMT system, and the transition time may be precisely predicted using the same. In particular, since the MPU presentation time represents the starting time of a particular MPU in an absolute unit (NTP or UTC time), an absolute reference for the MPU level may be set.

The last packet received may be identified by the packet ID (packet_id) and the packet sequence number. The last MPU received may be identified by the MPU sequence number.

However, the MMTP packetization and MPU encapsulation rule cannot continue after transition.

From a point of view of data, additional information to indicate the transition time is required. Thus, the MPU presentation time more accurately provides the last MPU received. Further, it is useful when the MMT entity or package location is changed during transition.

Further, the MMT receiver and the MMT transmitter may indicate the last sample delivered through the original delivery path. The last sample received after the packet and the MPU are identified is identified by the movie fragment sequence number and the sample number. It is useful when the transition is performed in the middle of the MPU. Without flushing the buffer performing the same process as the HRBM buffer, the MMT receiver may reconfigure the last MPU using prior samples. When the nature of the transport protocol, a transition point that is considerably accurate and absolute, may be provided from the information of the sample level, according to the disclosure, data traffic and processing time may be saved.

Figure 16:
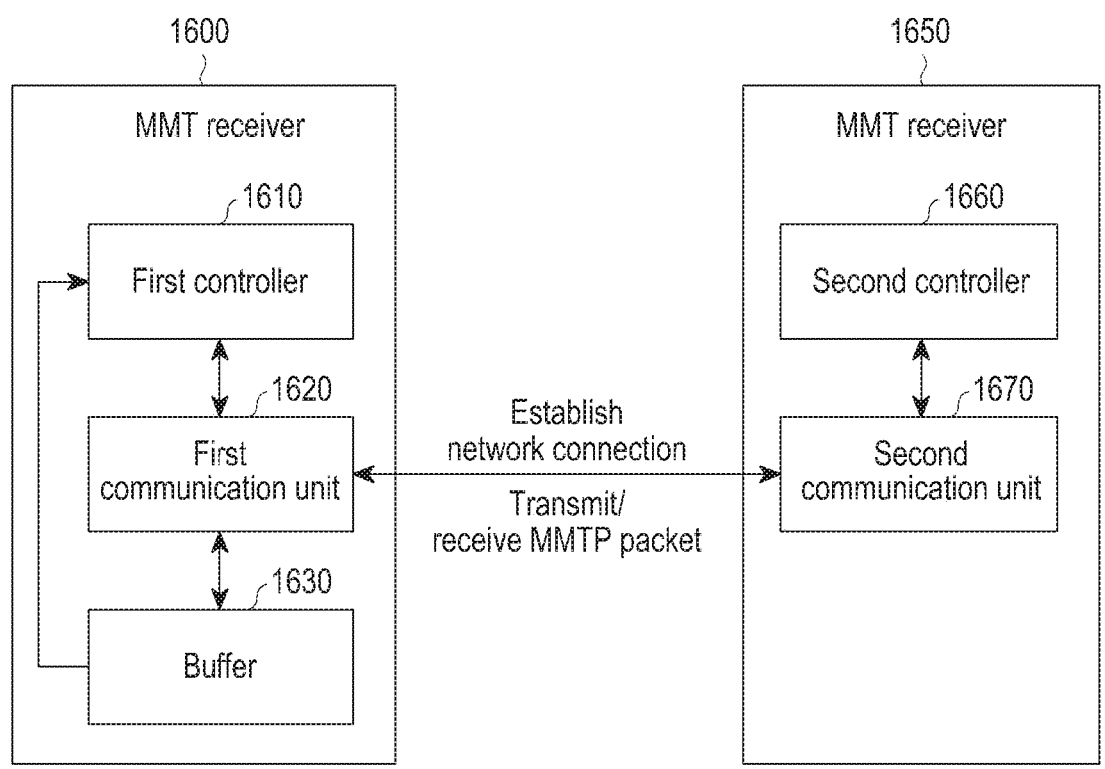
FIG. 16 is a view illustrating an example for describing an MMTP transmission/reception system including an MMT receiver and an MMT transmitter according to the disclosure.

FIG. 16 is a view illustrating an example for describing an MMTP network system including an MMT receiver and an MMT transmitter according to the disclosure.

The MMTP network system includes at least one MMT receiver and at least one MMT transmitter.

The MMT receiver may be a client that receives an MMT service, and the MMT transmitter may be a server that provides the MMT service. The MMT receiver and the MMT transmitter each may be a computer system including a processor and a memory.

According to the disclosure, an MMT receiver transmitting and receiving an MMTP packet includes a memory that stores a program to transmit and receive the MMTP packet and a processor to execute the program, wherein, as the program is executed, the processor, in order to transmit and receive the MMTP packet, establishes a network connection with an MMT transmitter, generates a first MMT signaling message, converts the generated first MMT signaling message into a first MMTP packet, transmits the first MMTP packet through the established network connection, receives a second MMTP packet through the established network connection, generates a second MMT signaling message using the second MMTP packet, receives a third MMTP packet, and reconfigures MPU data using the third MMTP packet and the second MMT signaling message, wherein receiving, by the processor, the third MMTP packet includes establishing a changed network connection based on the second MMT signaling message and receiving the third MMTP packet through the changed network connection.

According to the disclosure, an MMT transmitter transmitting and receiving an MMTP packet includes a memory that stores a program to transmit and receive the MMTP packet and a processor to execute the program, wherein, as the program is executed, the processor, in order to transmit and receive the MMTP packet, establishes a network connection with an MMT receiver, receives a first MMTP packet, reconfigures a first MMT signaling message using the first MMTP packet, generates a second MMT signaling message based on the first MMT signaling message, transmits a second MMTP packet into which the second MMT signaling message has been converted, and transmits a third MMTP packet based on the second MMT signaling message, wherein transmitting, by the processor, the third MMTP packet includes establishing a changed network connection based on the second MMT signaling message and transmitting the third MMTP packet through the changed network connection.

Figure 17:
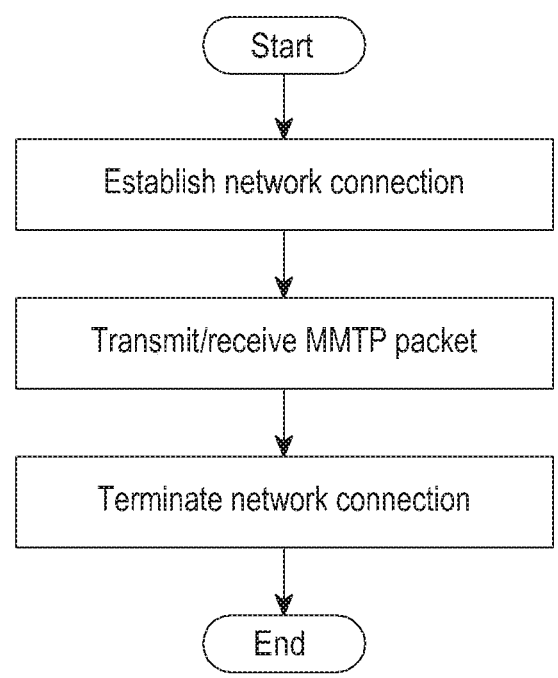
FIG. 17 is a flowchart illustrating a procedure for describing a method for transmitting and receiving MMTP packets according to the disclosure.

FIG. 17 is a flowchart illustrating a procedure for describing a method for transmitting and receiving MMTP packets according to the disclosure.

According to the disclosure, a method for transmitting and receiving an MMTP packet by an MMT receiver comprises, in order for the MMT receiver to transmit and receive the MMTP packet, establishing a network connection with an MMT transmitter and transmitting and receiving the MMTP packet through the established network connection.

According to the disclosure, a method for transmitting and receiving an MMTP packet by an MMT transmitter comprises, in order for the MMT transmitter to transmit and receive the MMTP packet, establishing a network connection with an MMT receiver and transmitting and receiving the MMTP packet through the established network connection.

To establish the network connection, typically, the MMT receiver sends a request for network connection to the MMT transmitter to establish a session. By doing so, a network connection is established between the MMT receiver and the MMT transmitter.

However, if there has been a network connection established between the MMT receiver and the MMT transmitter, the network connection from the MMT transmitter may be changed by a notification for changing the network connection.

At this time, the MMT transmitter may provide the notification to change the network connection at a particular time by setting a transition time. For the transition time, given a typical delay required to change a network connection, the number of MMTP packets transmittable during the delay time may be calculated, and the MMTP packets may be sent to the MMT receiver.

Figure 18:
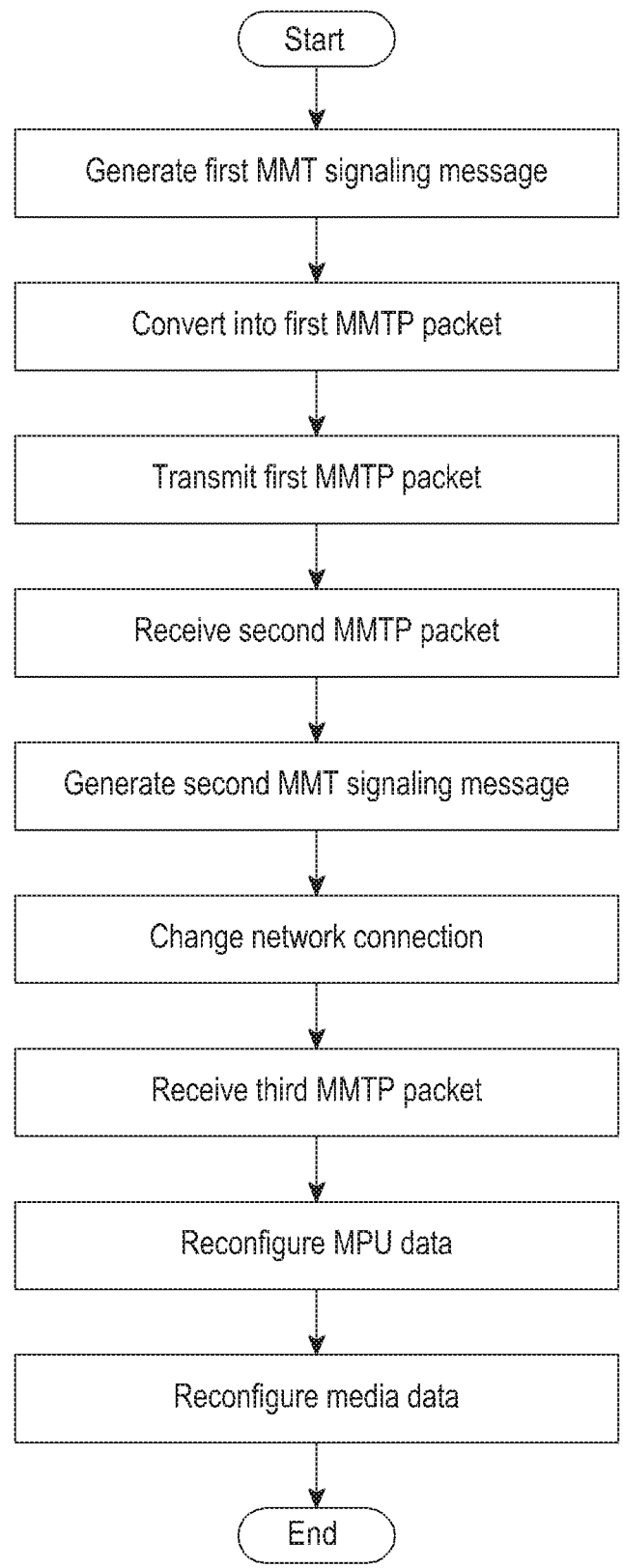
FIG. 18 is a flowchart illustrating a specific procedure for a method for transmitting and receiving MMTP packets by an MMT receiver according to the disclosure.

FIG. 18 is a flowchart illustrating a specific procedure for a method for transmitting and receiving MMTP packets by an MMT receiver according to the disclosure.

A method for transmitting and receiving an MMT protocol (MMTP) packet by an MMT receiver comprises, in order for the MMT receiver to transmit and receive the MMTP packet, establishing a network connection with an MMT transmitter, generating a first MMT signaling message, converting the generated first MMT signaling message into a first MMTP packet, transmitting the first MMTP packet through the established network connection, receiving a second MMTP packet through the established network connection, generating a second MMT signaling message using the second MMTP packet, receiving a third MMTP packet, and reconfiguring MPU data using the third MMTP packet and the second MMT signaling message, wherein receiving the third MMTP packet includes establishing a changed network connection based on the second MMT signaling message and receiving the third MMTP packet through the changed network connection.

The first MMT signaling message may be a message to request changing the MMT network connection, and the second MMT signaling message may be a message for the notification of the network change as per the request of the first MMT signaling message. The third MMTP packet may be a packet received through the changed network connection as per the request of the first MMT signaling message.

The first MMT signaling message may include an IP address, a port number, a packet ID (packet id), a packet sequence number, an MPU sequence number, and an MPU presentation time. That is, the first MMT signaling message may be the above-described MMT transition request (MTR) message.

The IP address and the port number may be related to information about the network connection to be changed for the MMT receiver. The packet ID may specify an asset, the packet sequence number may specify a packet in one asset, the MPU sequence number may specify an MPU in one asset, and the MPU presentation time may be the time to present the MPU specified by the MPU sequence number. The MPU presentation time may be created in NTP or UTC format, representing an absolute time.

The first MMT signaling message may further include a movie fragment sequence number and a sample number.

The movie fragment sequence number may specify a movie fragment in one asset, and the sample number may specify a sample in the MPU specified by the MPU sequence number.

The asset contained in the MMTP packet being transmitted may be specified by the packet ID. A position, within the specified asset, of the MPU contained in the MMTP packet being transmitted may be specified by the MPU sequence number. Further, which MFU of the particular MPU the sample is included in may be specified by the movie fragment sequence number and the sample number.

Since the method for packetizing the MPEG media data as per the asset-MPU-sample layer has been standardized by the MMT protocol (MMTP), the location of the MMTP packet to be transmitted may be accurately obtained from the packet ID, MPU sequence number, movie fragment sequence number, and sample number. As the MMT receiver transmits the packet ID, MPU sequence number, movie fragment sequence number, and sample number to the MMT transmitter using the MTR message, the MMT transmitter may precisely indicate the MMTP packet to be transmitted.

The second MMT signaling message may include an IP address, a port number, a transition time, a packet ID, a packet sequence number, an MPU sequence number, and an MPU presentation time. The second MMT signaling message may further include a movie fragment sequence number and a sample number. That is, the second MMT signaling message may be the above-described MMT transition notification (MTN) message.

The MMT transmitter may receive the MTR message and may properly transmit the MMTP packet. However, since the MMT receiver may only provide the information about the MMTP packets received until the MTR message is sent through the MTR message, it may calculate a transition time given the delay time required to change the network connection, produce MMTP packets transmittable during the delay time using the information obtained from the MTR message, and considering the same, send out the MTN message. However, when the MMT receiver cannot receive all of the MMTP packets predicted by the MMT transmitter, the MMT receiver may put information about the last MMTP packet received in the MTR message and resend the MTR message. The MTR message is transferred in MMTP packets as per the MMTP. At this time, the MTR message sent by the MMT receiver is the same in syntax, and the information about the network currently in connection may be used, as it is, for the IP address and port number which are address information. That is, for the MTR message, data integrity may be maintained by retransmitting the MMTP packets rather than using the FEC. That is, upon receiving the MTR message with the same IP address and port number, the MMT transmitter may determine MMTP packets to be transmitted based only on the MTR message information without relying on the transition time.

A method for transmitting and receiving MMTP packets by an MMT transmitter would be apparent from the description.

Figure 19:
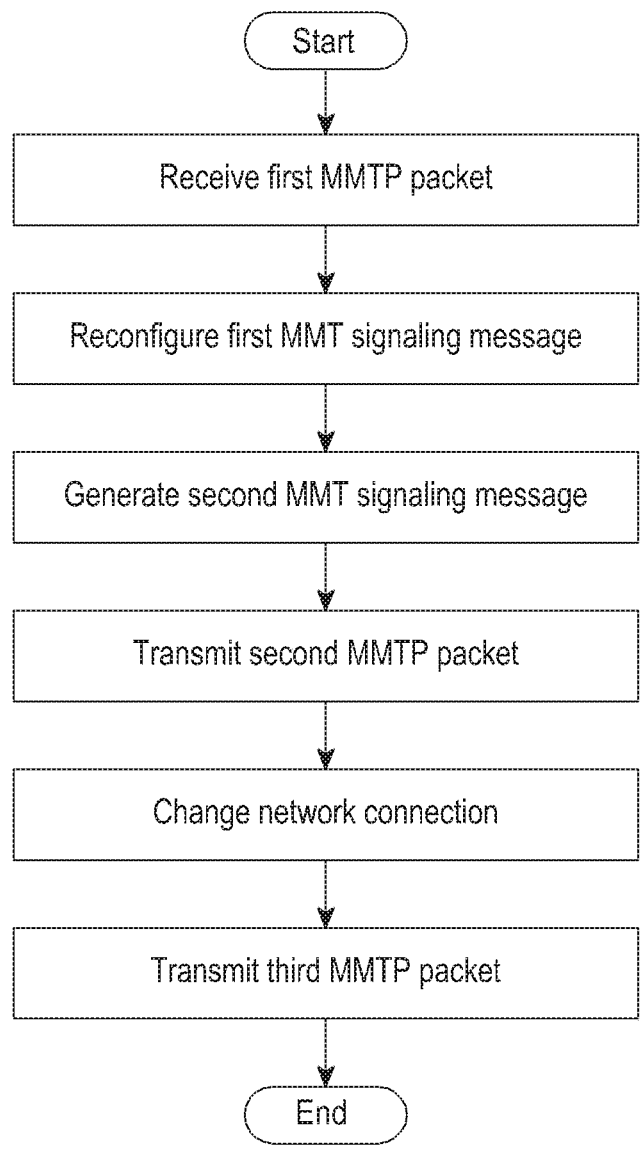
FIG. 19 is a flowchart illustrating a specific procedure for a method for transmitting and receiving MMTP packets by an MMT transmitter according to the disclosure.

FIG. 19 is a flowchart illustrating a specific procedure for a method for transmitting and receiving MMTP packets by an MMT transmitter according to the disclosure.

A method for transmitting and receiving an MMTP packet by an MMT transmitter comprises, in order for the MMT transmitter to transmit and receive the MMTP packet, establishing a network connection with an MMT receiver, receiving a first MMTP packet, reconfiguring a first MMT signaling message using the first MMTP packet, generating a second MMT signaling message based on the first MMT signaling message, transmitting a second MMTP packet into which the second MMT signaling message has been converted, and transmitting a third MMTP packet based on the second MMT signaling message, wherein transmitting the third MMTP packet includes establishing a changed network connection based on the second MMT signaling message and transmitting the third MMTP packet through the changed network connection.

The first MMT signaling message may be a message to request changing the MMT network connection, and the second MMT signaling message may be a message for the notification of the network change as per the request of the first MMT signaling message. The third MMTP packet may be a packet received through the changed network connection as per the request of the first MMT signaling message.

The first MMT signaling message may include an IP address, a port number, a packet ID (packet id), a packet sequence number, an MPU sequence number, and an MPU presentation time.

The first MMT signaling message may further include a movie fragment sequence number and a sample number.

The movie fragment sequence number may specify a movie fragment in one asset, and the sample number may specify a sample in the MPU specified by the MPU sequence number.

The second MMT signaling message may include an IP address, a port number, a transition time, a packet ID, a packet sequence number, an MPU sequence number, and an MPU presentation time.

The second MMT signaling message may further include a movie fragment sequence number and a sample number.

A method for transmitting and receiving a packet by a transmitter in a multimedia service comprises generating a first signaling message, transmitting a first packet obtained by packetizing the first signaling message, and transmitting a second packet based on the first signaling message. Transmitting the second packet includes changing a network connection based on the first signaling message and transmitting the second packet through the changed network connection. The first signaling message includes an IP address and port number related to the changed network connection. The first signaling message includes at least one of a transition time, which is a time when the changed network connection applies, a packet ID (packet id) to specify an asset containing the packet, a packet sequence number to specify a packet in the asset, an MPU sequence number to specify an MPU in the asset, and an MPU presentation time to specify the specified MPU.

The first signaling message may further include at least one of a movie fragment sequence number to indicate a sequence number of a movie fragment to which a sample belongs and a sample number to specify a sample in the movie fragment.

The method for transmitting and receiving a packet by the transmitter in the multimedia service may further comprise receiving the third packet and reconfiguring a second signaling message by depacketizing the third packet. Generating the first signaling message may include generating the first signaling message based on the second signaling message.

The second signaling message may be a message to request changing the network connection, and the first signaling message may be a message for the notification of the network change as per the request of the second signaling message. The second packet may be a packet received through the changed network connection as per the request of the second signaling message.

The second signaling message may include an IP address and port number related to the changed network connection.

The second signaling message may include at least one of a packet ID (packet id) to specify the asset containing the packet, a packet sequence number to specify a packet in the asset, an MPU sequence number to specify an MPU in the asset, and an MPU presentation time to specify the specified MPU.

The second signaling message may further include at least one of a movie fragment sequence number to indicate a sequence number of a movie fragment to which a sample belongs and a sample number to specify a sample in the movie fragment.

Generating the first signaling message may include determining the transition time by considering the delay time required to change the network connection and generating the first MMT signaling message based on the second signaling message and the determined transition time.

Transmitting the second packet may include transmitting the second packet based on the first MMT signaling message using the pre-change network connection until the network connection is changed, if the transition time arrives, changing the network connection, and subsequently transmitting the second packet through the changed network connection.

A method for transmitting and receiving a packet by a receiver in a multimedia service may comprise generating a first signaling message, packetizing the generated first signaling message into a first packet, and transmitting the first packet.

The first signaling message may include an IP address and port number related to information about a network connection to which it is to be changed.

The first signaling message may include at least one of a packet ID (packet id) to specify an asset, a packet sequence number to specify a packet in the asset, an MPU sequence number to specify an MPU in the asset, and an MPU presentation time that is a time for presenting the MPU specified by the MPU sequence number.

The first signaling message may further include at least one of a movie fragment sequence number to specify a movie fragment in the asset and a sample number to specify a sample in the MPU The method for transmitting and receiving a packet by the receiver in the multimedia service may further comprise receiving a second packet, generating a second signaling message using the second packet, receiving a third packet, and reconfiguring MPU data using the third packet and the second signaling message.

The first signaling message may be a request message to request changing the network connection.

The second signaling message may be a notification message as per the request of the first signaling message.

The third packet may be a packet received through the changed network connection as per the request of the first signaling message.

Receiving the third packet may include changing the network connection based on the second signaling message and receiving the third packet through the changed network connection.

The second MMT signaling message may include at least one of a transition time, which is a time when the changed network connection applies, a packet ID (packet id) to specify the asset containing the packet, a packet sequence number to specify a packet in the asset, an MPU sequence number to specify an MPU in the asset, and an MPU presentation time to specify the specified MPU.

The second signaling message may further include at least one of a movie fragment sequence number to indicate a sequence number of a movie fragment to which a sample belongs and a sample number to specify a sample in the movie fragment.

The above-described operations may be realized by equipping a memory device retaining their corresponding codes in any component of an entity, function, access point (AP), server, or a terminal device in a communication system. That is, the controller in the entity, function, AP, server, or terminal device may execute the above-described operations by reading and running the program codes stored in the memory device by a processor or central processing unit (CPU).

As described herein, various components or modules in the entity, function, AP, server, or terminal device may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICs.

Although specific embodiments of the present disclosure have been described above, various changes may be made thereto without departing from the scope of the present disclosure. Thus, the scope of the present disclosure should not be limited to the above-described embodiments, and should rather be defined by the following claims and equivalents thereof.

The invention claimed is:

1. A method of a transmitting entity, the method comprising:
    receiving, from a receiving entity, at least one first packet through a first network connection,
        wherein each of the at least one first packet comprises a header and a payload, the header including a packet identifier (ID) (packet id) and a packet sequence number of a corresponding packet, and the payload including data of a first signaling message related to a change of a network connection from the first network connection to a second network connection, and
        wherein the first signaling message includes an Internet protocol (IP) address and a port number related to the second network connection to be changed, a packet id and a packet sequence number of a last packet received by the receiving entity through the first network connection, and a media processing unit (MPU) sequence number and an MPU presentation time of a last MPU received by the receiving entity through the first network connection; and transmitting, to the receiving entity, at least one second packet through the second network connection based on the first signaling message, a payload of the at least one second packet including data of a next MPU of the last MPU.

2. The method of claim 1, wherein the first signaling message further includes at least one of a movie fragment sequence number to indicate a sequence number of a movie fragment to which a sample belongs and a sample number to specify the sample in the movie fragment.

3. The method of claim 1, further comprising transmitting a second signaling message,
wherein the second signaling message includes the IP address and the port number related to the second network connection to be changed, and
wherein the second signaling message is provided based on a request for the first signaling message.

4. The method of claim 3, wherein the second signaling message includes at least one of the packet id, a transition time that is a time when the second network connection applies, the packet sequence number, the MPU sequence number, and the MPU presentation time.

5. The method of claim 4, wherein the second signaling message further includes at least one of a movie fragment sequence number and a sample number.

6. A transmitting entity, the transmitting entity comprising:
a transceiver; and
at least one processor configured to:
receive, from a receiving entity, at least one first packet through a first network connection,
wherein each of the at least one first packet comprises a header and a payload, the header including a packet identifier (ID) (packet id) and a packet sequence number of a corresponding packet, and the payload including data of a first signaling message related to a change of a network connection from the first network connection to a second network connection, and
wherein the first signaling message includes an Internet protocol (IP) address and a port number related to the second network connection to be changed, a packet id and a packet sequence number of a last packet received by the receiving entity through the first network connection, and a media processing unit (MPU) sequence number and an MPU presentation time of a last MPU received by the receiving entity through the first network connection, and
transmit, to the receiving entity, at least one second packet through the second network connection based on the first signaling message, a payload of the at least one second packet including data of a next MPU of the last MPU.

7. A method of a receiving entity, the method comprising:
transmitting, to a transmitting entity, at least one first packet through a first network connection and a first signaling message related to a change of a network connection,
wherein each of the at least one first packet comprises a header and a payload, the header including a packet identifier (ID) (packet id) and a packet sequence number of a corresponding packet, and the payload including data of a first signaling message related to a change of a network connection from the first network connection to a second network connection, and wherein the first signaling message includes an Internet protocol (IP) address and a port number related to the second network connection to be changed, a packet id and a packet sequence number of a last packet received by the receiving entity through the first network connection, and a media processing unit (MPU) sequence number and an MPU presentation time of a last MPU received by the receiving entity through the first network connection; and receiving, from the transmitting entity, at least one second packet through the second network connection based on the first signaling message, a payload of the at least one second packet including data of a next MPU of the last MPU.

8. The method of claim 7, wherein the first signaling message further includes at least one of a movie fragment sequence number to indicate a sequence number of a movie fragment to which a sample belongs and a sample number to specify the sample in the movie fragment.

9. The method of claim 7, further comprising receiving a second signaling message, wherein the second signaling message includes at least one of the packet id, a transition time that is a time when the second network connection applies, the packet sequence number, the MPU sequence number, and the MPU presentation time.

10. The method of claim 9, wherein the second signaling message further includes at least one of a movie fragment sequence number and a sample number.

11. A receiving entity, the receiving entity comprising:
a transceiver; and
at least one processor configured to:
transmit, to a transmitting entity, at least one first packet through a first network connection and a first signaling message related to a change of a network connection,
wherein each of the at least one first packet comprises a header and a payload, the header including a packet identifier (ID) (packet id) and a packet sequence number of a corresponding packet, and the payload including data of a first signaling message related to a change of a network connection from the first network connection to a second network connection, and
wherein the first signaling message includes an Internet protocol (IP) address and a port number related to the second network connection to be changed, a packet id and a packet sequence number of a last packet received by the receiving entity through the first network connection, and a media processing unit (MPU) sequence number and an MPU presentation time of a last MPU received by the receiving entity through the first network connection, and
receive, from the transmitting entity, at least one second packet through the second network connection based on the first signaling message, a payload of the at least one second packet including data of a next MPU of the last MPU.

12. The receiving entity of claim 11,
wherein the at least one processor is further configured to receive a second signaling message, and wherein the second signaling message includes at least one of the packet id, a transition time that is a time when the second network connection applies, the packet sequence number, the MPU sequence number, and the MPU presentation time.

\* \* \* \* \*